US008497766B2

(12) United States Patent
Asayama et al.

(10) Patent No.: US 8,497,766 B2

(45) Date of Patent: Jul. 30, 2013

(54) KEY INPUT DEVICE FOR REMOTE CONTROL APPARATUS, KEY INPUT METHOD OF KEY INPUT DEVICE FOR REMOTE CONTROL APPARATUS, PROGRAM, AND RECORDING MEDIUM

(75) Inventors: Sako Asayama, Osaka (JP); Mitsuharu Matsuo, Ehime (JP); Keisuke Matsuo, Nara (JP)

(73) Assignee: Panasonic Corporation, Osaka (JP)

( * ) Notice: Subject to any disclaimer, the term of this patent is extended or adjusted under 35 U.S.C. 154(b) by 385 days.

(21) Appl. No.: 13/063,350

(22) PCT Filed: Aug. 6, 2009

(86) PCT No.: PCT/JP2009/003774

§ 371 (c)(1), (2), (4) Date: Mar. 10, 2011

(87) PCT Pub. No.: WO2010/029683

PCT Pub. Date: Mar. 18, 2010

(65) Prior Publication Data

US 2011/0164189 A1 Jul. 7, 2011

(30) Foreign Application Priority Data

Sep. 12, 2008 (JP) ................................ 2008-235348

(51) Int. Cl.
*G05B 11/01* (2006.01)

(52) U.S. Cl.
USPC ...................................................... 340/12.22

(58) Field of Classification Search
USPC 340/5.64, 12.22, 426.13; 341/176; 348/14.05
See application file for complete search history.

(56) References Cited

U.S. PATENT DOCUMENTS

| | | | |
|---|---|---|---|
| 5,497,185 | A | 3/1996 | Dufresne et al. |
| 5,572,317 | A | 11/1996 | Parker et al. |
| 2004/0268391 | A1 | 12/2004 | Clercq et al. |
| 2005/0027876 | A1 | 2/2005 | Umei et al. |

FOREIGN PATENT DOCUMENTS

| | | |
|---|---|---|
| JP | 10-301743 | 11/1998 |
| JP | 2002-318876 | 10/2002 |
| JP | 2005-128712 | 5/2005 |
| JP | 2008-41259 | 2/2008 |
| JP | 2008-72557 | 3/2008 |

OTHER PUBLICATIONS

International Search Report issued Nov. 2, 2009 in corresponding International Application No. PCT/JP2009/003774.

International Preliminary Report on Patentability issued Nov. 17, 2010 in corresponding International Application No. PCT/JP2009/003774 (with English translation).

*Primary Examiner* — Vernal Brown

(74) *Attorney, Agent, or Firm* — Wenderoth, Lind & Ponack, L.L.P.

(57) ABSTRACT

A first control unit outputs, to a lighting control unit, a lighting signal that causes a plurality of light-emitting units provided for each of a plurality of keys for operating to be sequentially lighted for each of groups determined in advance. Based on a signal for selecting a group outputted from a first selection unit and an output signal from the first control unit, a first comparison/judgment unit outputs a group whose light-emitting unit had been lighted upon selection as a finalized group. A second control unit outputs a lighting signal that causes light-emitting units included in the finalized group to be respectively sequentially lighted, and based on the output signal and a signal for selecting a key outputted from a second selection unit, a second comparison/judgment unit judges that a key corresponding to a light-emitting unit that had been lighted upon selection as a finalized key.

7 Claims, 20 Drawing Sheets

121

KEY INPUT DEVICE FOR REMOTE CONTROL APPARATUS, KEY INPUT METHOD OF KEY INPUT DEVICE FOR REMOTE CONTROL APPARATUS, PROGRAM, AND RECORDING MEDIUM

CROSS-REFERENCE TO RELATED APPLICATIONS

This application is a U.S. national phase application of PCT International Patent Application No. PCT/JP2009/003774 filed Aug. 6, 2009, claiming the benefit of priority of Japanese Patent Application No. 2008-235348 filed Sep. 12, 2008, all of which are incorporated by reference herein in their entirety.

TECHNICAL FIELD

The present invention relates to a key input device for a remote control apparatus for operating a television set, and a key input method and the like of the key input device for the remote control apparatus.

BACKGROUND ART

A remote control apparatus (remote control) is a common method of operating a television set (hereinafter referred to as television). The use of a remote control enables a television to be operated from a location separated from the television such as a sofa from which the television is viewed without having to approach a television main body in order to operate switches or buttons provided on the television main body.

Generally, a remote control comes with a television upon purchase and is therefore readily obtained. In addition, some remote controls are sold separate from television main bodies.

In particular, the recent digitalization of televisions and an increasing range of functions being offered have led to an increase in the functions and the number of buttons in remote controls, making operations more complex. For example, types of broadcasting now available include terrestrial analog broadcasting, terrestrial digital broadcasting, satellite broadcasting, cable broadcasting and the like, necessitating a switch or a button to switch among the types of broadcasting. In addition, a setting menu, an Electronic Program Guide, or the like of a television is displayed as a GUI (graphical user interface) on a screen, and operations thereof necessitate buttons for moving a focal point on the screen upward, downward, leftward, or rightward, buttons for selecting a specific menu or button on the screen, and the like.

Remote controls have been realized which feature ingeniously designed button arrangements, labeling, and the like for the purpose of simplifying such complicated operations.

In addition, remote controls referred to as "simplified remote controls" have been realized which place emphasis on button size and the ease in operating buttons and which limit the number of buttons and functions that can be operated.

One such remote control is a remote control apparatus capable of improving operability by informing a viewer of a classification among program information in such a manner that the classification can be confirmed at a glance (for example, refer to Japanese Patent Laid-Open No. 2008-072557). The remote control apparatus according to Japanese Patent Laid-Open No. 2008-072557 receives program genre information from a television, assigns a color to a channel key button based on the program genre information, and lights an LED built into the channel key button.

SUMMARY OF INVENTION

Technical Problem

However, even a simplified remote control with a reduced number of buttons and increased button sizes cannot be described as being sufficiently easy to use for an elderly person or the like with impaired judgment or impaired physical performance.

To an elderly person with impaired judgment, even a reduced number of buttons is one too many and it is not necessarily easy to select a button corresponding to a process that the person wishes a television to perform from a plurality of buttons.

In addition, simply increasing button sizes does not necessarily translate to sufficient usability for an elderly person with quivering fingers or the like because, for example, even if the person knows which button on a remote control must be pressed, the quivering of a finger while attempting to press the button may result in inadvertently pressing an adjacent button.

The present invention is made in consideration of the conventional problems described above, and an object thereof is to provide a key input device for a remote control apparatus that is easy to use even for an elderly person with impaired judgment or impaired physical performance, and an input method and the like of the key input device.

SUMMARY OF THE INVENTION

To solve the above-described problems, the 1$^{st}$ aspect of the present invention is a key input device for a remote control apparatus, the key input device comprising:

a plurality of predetermined keys that operate an operation object device;

a plurality of light-emitting units which are provided on or in the vicinity of the respective keys and which are to be lighted;

a lighting control unit that controls lighting of the plurality of light-emitting units based on an inputted lighting signal;

a receiving unit which receives a signal indicating a state of the operation object device from the operation object device;

a first control unit that outputs, to the lighting control unit, a lighting signal that causes, according to the received signal indicating the state of the operation object device, the plurality of light-emitting units to be sequentially lighted for each predetermined period of time for each group determined in advance or a lighting signal that causes, according to the received signal indicating the state of the operation object device, the plurality of light-emitting units to be sequentially lighted for each predetermined period of time for each group determined in advance, in a color or brightness that differs from other groups;

a first selecting unit that outputs a signal for selecting one of the groups;

a first comparison/judgment unit that inputs output signals of the first control unit and the first selecting unit and outputs, as a finalized group, a group selected when the light-emitting unit had been lighted or when the light-emitting unit had been lighted in the different color or the different brightness;

a second control unit that outputs, to the lighting control unit, a lighting signal that causes the respective light-emitting units included in the finalized group to be sequentially lighted for each predetermined period of time or a lighting signal that causes the respective light-emitting units included in the finalized group to be sequentially lighted for each predetermined period of time in a color or brightness that differs from other light-emitting units;

a second selecting unit that outputs a signal for selecting one of the keys; and a second comparison/judgment unit that inputs output signals of the second control unit and the second selecting unit and outputs, as a finalized key, a key corresponding to the light-emitting unit that had been lighted upon selection or a key corresponding to the light-emitting unit that had been lighted in the different color or the different brightness upon selection, wherein when only one light-emitting unit is included in the finalized group, the first comparison/judgment unit outputs a key corresponding to the light-emitting unit as a finalized key.

The 3rd aspect of the present invention is the key input device for a remote control apparatus according to the 1st aspect of the present invention, wherein a single externally-connected switch device functions as both the first selecting unit and the second selecting unit, and the switch device outputs a single on/off signal.

The 4th aspect of the present invention is the key input device for a remote control apparatus according to the 1st aspect of the present invention, wherein the predetermined period of time during which each group is to be lighted is a period determined in advance for each group, and the predetermined period of time during which each light-emitting unit is to be lighted is a period determined in advance for each light-emitting unit.

The 5th aspect of the present invention is the key input device for a remote control apparatus according to the 1st aspect of the present invention, wherein the first control unit and the second control unit output a lighting signal that causes lighting in a predetermined color or at a predetermined brightness to the lighting control unit, in regards to the light-emitting unit corresponding to one or more of the keys that cannot operate the operation object device depending on a state of the operation object device, the first control unit outputs a lighting signal that causes sequential lighting at a predetermined period of time in a color or at a brightness that differs from other groups, for each of the groups determined in advance, to the lighting control unit, in regards to the plurality of light-emitting units with the exception of the light-emitting unit corresponding to the key that cannot operate the operation object device depending on a state of the operation object device, and the second control unit outputs a lighting signal that causes sequential lighting at a predetermined period of time in a color or at a brightness that differs from other light-emitting units, for each light-emitting unit included in the finalized group, to the lighting control unit, in regards to the plurality of light-emitting units with the exception of the light-emitting unit corresponding to the key that cannot operate the operation object device depending on a state of the operation object device.

The 6th aspect of the present invention is a key input device for a remote control apparatus, the key input device comprising:

a plurality of predetermined keys that operate an operation object device;

a plurality of light-emitting units which are provided on or in the vicinity of the respective keys and which are to be lighted;

a lighting control unit that controls lighting of the plurality of light-emitting units based on an inputted lighting signal;

a first control unit that outputs, to the lighting control unit, a lighting signal that causes the plurality of light-emitting units to be sequentially lighted for each predetermined period of time for each group determined in advance or a lighting signal that causes the plurality of light-emitting units to be sequentially lighted for each predetermined period of time for each group determined in advance, in a color or brightness that differs from other groups;

a first selecting unit that outputs a signal for selecting one of the groups;

a first comparison/judgment unit that inputs output signals of the first control unit and the first selecting unit and outputs, as a finalized group, a group selected when the light-emitting unit had been lighted or when the light-emitting unit had been lighted in the different color or the different brightness;

a second control unit that outputs, to the lighting control unit, a lighting signal that causes the respective light-emitting units included in the finalized group to be sequentially lighted for each predetermined period of time or a lighting signal that causes the respective light-emitting units included in the finalized group to be sequentially lighted for each predetermined period of time in a color or brightness that differs from other light-emitting units;

a second selecting unit that outputs a signal for selecting one of the keys; and a second comparison/judgment unit that inputs output signals of the second control unit and the second selecting unit and outputs, as a finalized key, a key corresponding to the light-emitting unit that had been lighted upon selection or a key corresponding to the light-emitting unit that had been lighted in the different color or the different brightness upon selection, wherein when only one light-emitting unit is included in the finalized group, the first comparison/judgment unit outputs a key corresponding to the light-emitting unit as a finalized key; and when regular lighting of the light-emitting unit for an arbitrary one of the light-emitting units or for each of the groups is to be performed, at least one of the first control unit and the second control unit outputs, to the lighting control unit, a lighting signal for notifying, in advance, regular lighting of the light-emitting unit which is to be next subjected to regular lighting by a predetermined method during at least one predetermined period of time among periods of time after a point in time at which the regular lighting is to be started and before a point in time at which regular lighting of the light-emitting unit to be next subjected to regular lighting is started, and causes the light control unit to perform preliminary lighting.

The 7th aspect of the present invention is a key input method of a key input device for a remote control apparatus including a plurality of predetermined keys for operating an operation object device and a plurality of light-emitting units which are provided on or in the vicinity of the respective keys and which are to be lighted, the key input method comprising:

a first control step in which a signal indicating a state of the operation object device from the operation object device is received and the plurality of light-emitting units are, according to the received signal indicating the state of the operation object device, sequentially lighted for each predetermined period of time for each group determined in advance or the plurality of light-emitting units are, according to the received signal indicating the state of the operation object device, sequentially lighted for each predetermined period of time for each group determined in advance, in a color or brightness that differs from other groups;

a first selecting step in which a signal for selecting one of the groups is outputted;

a first comparison/judgment step in which a group selected when lighting had been performed for each group determined in advance or when lighting had been performed in the different color or the different brightness for each group determined in advance is judged to be a finalized group;

a second control step in which the respective light-emitting units included in the finalized group are sequentially lighted for each predetermined period of time or the respective light-emitting units included in the finalized group are sequentially lighted for each predetermined period of time in a color or brightness that differs from other light-emitting units;

a second selecting step in which a signal for selecting one of the keys is outputted; and a second comparison/judgment step in which a key selected when the light-emitting unit included in the finalized group had been lighted or when the light-emitting unit included in the finalized group had been lighted in the different color or the different brightness is judged to be a finalized key, wherein when only one of the light-emitting units is included in the finalized group, a key corresponding to the light-emitting unit is judged to be the finalized key in the first comparison/judgment step.

The $8^{th}$ aspect of the present invention is a non-transitory computer-readable medium having a program recorded thereon for causing a computer to execute the key input method of a key input device for a remote control apparatus according to the $7^{th}$ aspect of the present invention.

The first invention related to the present invention is a remote control apparatus comprising:

a plurality of keys that operate an operation object device;

a plurality of light-emitting units which are provided on or in the vicinity of the respective keys and which are to be lighted;

a lighting control unit that controls lighting of the plurality of light-emitting units based on an inputted lighting signal;

a transmitting unit which transmits a signal corresponding to the key to the operation object device; and a control unit that transmits, to the lighting control unit, a lighting signal indicating whether the light-emitting unit is to be lighted or a lighting signal that causes the light-emitting units to be lighted by different color or by changing brightness, so as to show brightly the keys that can be operated for the operation object device at the time according to a state of the operation object device.

The second invention related to the present invention is the remote control apparatus of the first invention related to the present invention, wherein the control unit transmits the lighting signal which lights the light-emitting unit corresponding to a predetermined key among the keys that can be operated according to the state of the operation object device to the lighting control unit.

The third invention related to the present invention is the remote control apparatus of the first invention related to the present invention, the remote control apparatus comprising:

a receiving unit which receives a signal indicating the state of the operation object device from the operation object device, wherein the control unit decides, according to the signal indicating the state of the operation object device, the light-emitting unit to be lighted and transmits the lighting signal to the lighting control unit.

The forth invention related to the present invention is the remote control apparatus of the third invention related to the present invention, wherein:

the signal, which is received from the operation object device, indicating the state of the operation object device is a signal indicating the keys that can be operated for the operation object device at the time; and the control unit transmits a lighting signal that causes to light the light-emitting units according to the key indicated by the signal to the lighting control unit.

The fifth invention related to the present invention is the remote control apparatus of the first invention related to the present invention, wherein:

the operation object device is a television; and the state of the operation object device is a screen display state of the operation object device.

Advantageous Effects of Invention

The present invention is capable of providing a key input device for a remote control apparatus that is easy to use even for an elderly person with impaired judgment or impaired physical performance, and an input method and the like of the key input device.

DESCRIPTION OF EMBODIMENTS

Hereinafter, embodiments of the present invention will be described with reference to the drawings.

First Embodiment

Figure 1:
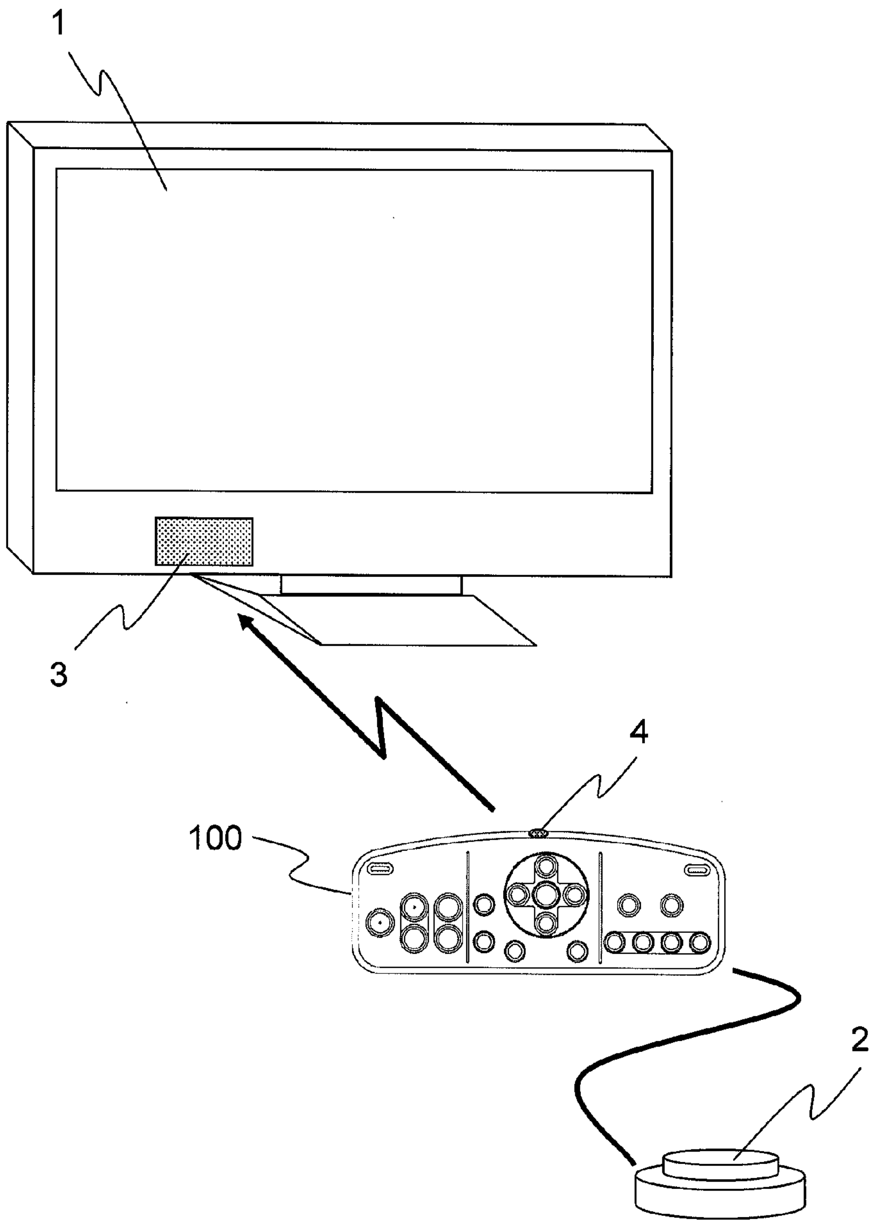
FIG. 1 is a configuration diagram of a remote control system according to a first embodiment of the present invention.

FIG. 1 is a configuration diagram of a remote control system according to a first embodiment of the present invention.

The remote control system according to the present first embodiment includes a television 1, a remote control apparatus 100 (hereinafter referred to as a remote control 100), and an external switch 2.

The television 1 includes a television-side infrared receiving/emitting unit 3, and the remote control 100 includes a remote control-side infrared receiving/emitting unit 4.

By an operation of the remote control 100 or an operation via the external switch 2, an execution item of the remote control 100 is selected and the remote control 100 transmits an infrared signal corresponding to the selected execution item from the remote control-side infrared receiving/emitting unit 4. The television 1 receives the signal at the television-side infrared receiving/emitting unit 3, in which case an operation of the television 1 is to be performed.

In addition, the remote control 100 may either be configured as a two-way remote control or a one-way remote control that only has a unidirectional transmitting function from the remote control to the television. In the case of a one-way remote control, operations are no different from those of a two-way remote control described below with the exception of not being able to accept instruction signals from the television.

Next, a configuration and functions of the remote control 100 according to the present first embodiment will be described. The configuration and functions of the remote control 100 according to the present first embodiment to be described below are shared by remote controls of other embodiments of the present invention.

Figure 2:
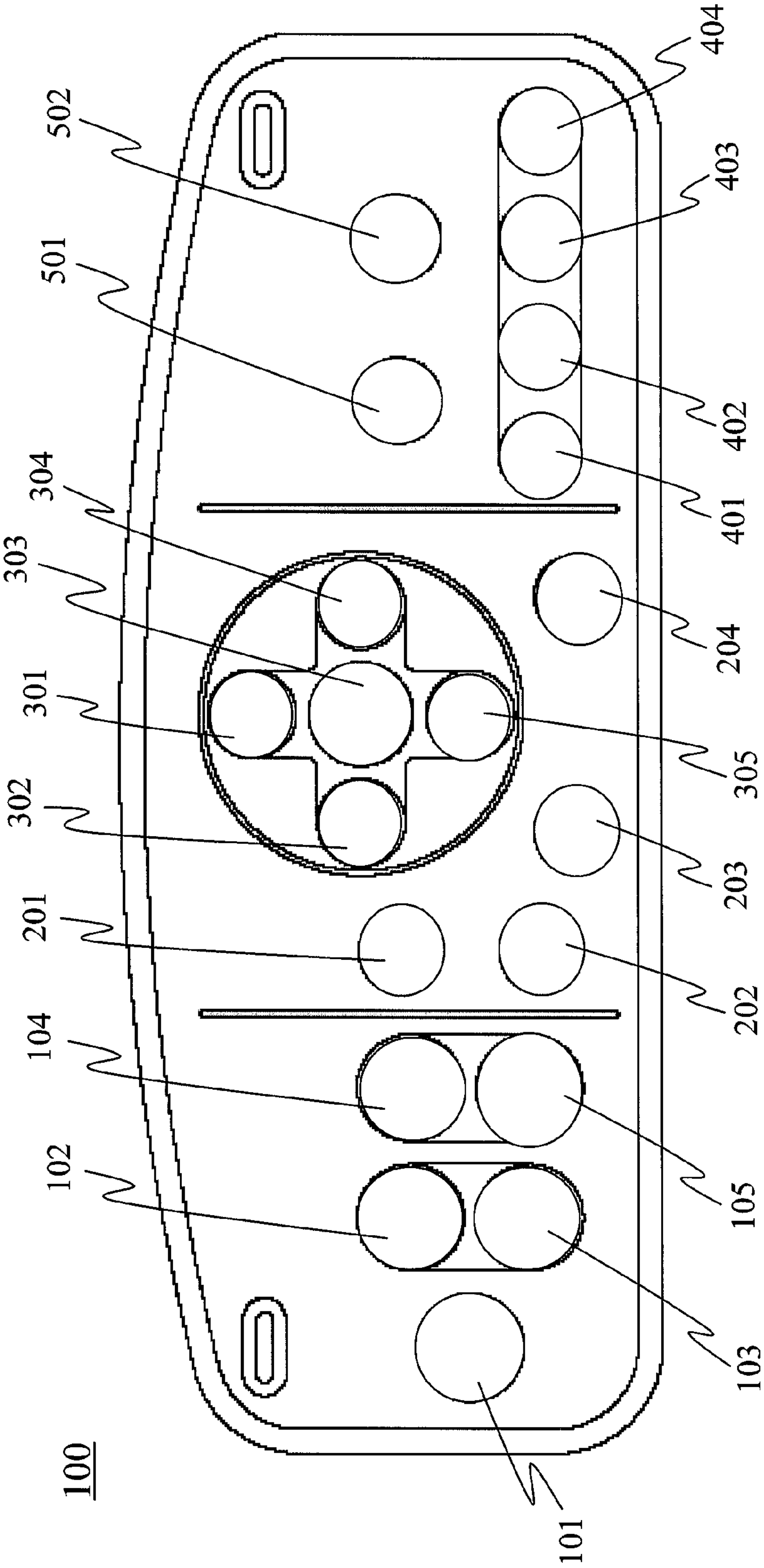
FIG. 2 is an overview illustrating a configuration of a remote control according to the first embodiment of the present invention.

FIG. 2 is an overview of the remote control 100 according to the present first embodiment.

The remote control 100 enables the television 1 to be operated by pressing a button corresponding to a desired operation of the television 1.

As far as a power supply and remote control signals are concerned, similar to an ordinary remote control that comes with a television or other remote controls, the remote control 100 includes a battery unit into which a corresponding battery is inserted, a transmitting unit that transmits remote control signals, and the like. However, the battery unit, the transmitting unit, and the like have been omitted in FIG. 2.

The remote control 100 includes a total of 20 buttons, namely, a power button 101, a channel up button 102, a channel down button 103, a volume up button 104, a volume down button 105, a link button 201, a program list button 202, a sub menu button 203, a return button 204, an up button 301, a left button 302, a decision button 303, a right button 304, a down button 305, a blue button 401, a red button 402, a green button 403, a yellow button 404, a broadcasting switching button 501, and a data broadcasting button 502.

When the power button 101 of the remote control 100 is pressed, an infrared signal corresponding to the power button 101 is transmitted from the infrared receiving/emitting unit 4. Upon receiving the signal at the infrared receiving/emitting unit 3, the television 1 is turned on if not already turned on and is turned off if already turned on.

When the channel up button 102 of the remote control 100 is pressed, an infrared signal corresponding to the channel up button 102 is transmitted from the infrared receiving/emitting unit 4. Upon receiving the signal at the infrared receiving/emitting unit 3, the television 1 switches to a channel having a channel number that is larger than a channel number of a channel viewed before the button was pressed by one or by a predetermined number.

When the channel down button 103 of the remote control 100 is pressed, an infrared signal corresponding to the channel down button 103 is transmitted from the infrared receiving/emitting unit 4. Upon receiving the signal at the infrared receiving/emitting unit 3, the television 1 switches to a channel having a channel number that is smaller than a channel number of a channel viewed before the button was pressed by one or by a predetermined number.

When the volume up button 104 of the remote control 100 is pressed, an infrared signal corresponding to the volume up button 104 is transmitted from the infrared receiving/emitting unit 4. Upon receiving the signal at the infrared receiving/emitting unit 3, the television 1 switches to a volume that is higher than a volume outputted before the button was pressed by a predetermined quantity.

When the volume down button 105 of the remote control 100 is pressed, an infrared signal corresponding to the volume down button 105 is transmitted from the infrared receiving/emitting unit 4. Upon receiving the signal at the infrared receiving/emitting unit 3, the television 1 switches to a volume that is lower than a volume outputted before the button was pressed by a predetermined quantity.

By operating a menu displayed on a screen of the television 1, the remote control 100 also enables operation of a device such as a DVD recorder or an AV amplifier that is connected to the television 1 by a predetermined method. A button for operating such a connected device will tentatively be referred to as a link button (a link button 201 illustrated in FIG. 2).

When the link button 201 of the remote control 100 is pressed, an infrared signal corresponding to the link button 201 is transmitted from the infrared receiving/emitting unit 4. Upon receiving the signal at the infrared receiving/emitting unit 3, the television 1 displays, on the television screen, a menu (not shown) for operating a device such as a DVD recorder (not shown) or an AV amplifier (not shown) connected to the television 1. In addition, in a case where the menu for operating the device is already displayed on the television screen, the screen is terminated.

Furthermore, the television 1 that can be operated by the remote control 100 includes an Electronic Program Guide function which enables program list data transmitted by a broadcast station to be received and displayed and also enables a user to search and/or to perform a viewing reservation or a recording reservation of a desired program.

When the program list button 202 of the remote control 100 is pressed, an infrared signal corresponding to the program list button 202 is transmitted from the infrared receiving/emitting unit 4. Upon receiving the signal at the infrared receiving/emitting unit 3, the television 1 displays an Electronic Program Guide on the television screen. In addition, in a case where the Electronic Program Guide is already displayed on the television screen, the screen is terminated.

Moreover, the television 1 that can be operated by the remote control 100 includes, for example, a function for confirming a level of an antenna receiving broadcasting and the like, whereby the function can be operated from a menu referred to as a sub menu.

When the sub menu button 203 of the remote control 100 is pressed, an infrared signal corresponding to the sub menu button 203 is transmitted from the infrared receiving/emitting unit 4. Upon receiving the signal at the infrared receiving/emitting unit 3, the television 1 displays a sub menu on the television screen.

When the return button 204 of the remote control 100 is pressed, an infrared signal corresponding to the return button 204 is transmitted from the infrared receiving/emitting unit 4. Upon receiving the signal at the infrared receiving/emitting unit 3, for example, the television 1 returns to an immediately previous screen in a case of using a function displayed on the television screen such as the Electronic Program Guide or the sub menu described above.

When the up button 301 of the remote control 100 is pressed, an infrared signal corresponding to the up button 301 is transmitted from the infrared receiving/emitting unit 4. Upon receiving the signal at the infrared receiving/emitting unit 3, for example, the television 1 selects an item that is immediately above or above by a predetermined number of an item selected at that point on a screen displayed on the television screen such as the Electronic Program Guide or the sub menu described above.

When the left button 302 of the remote control 100 is pressed, an infrared signal corresponding to the left button 302 is transmitted from the infrared receiving/emitting unit 4. Upon receiving the signal at the infrared receiving/emitting unit 3, for example, the television 1 selects an item that is immediately left or left by a predetermined number of an item selected at that point on a screen displayed on the television screen such as the Electronic Program Guide or the sub menu described above.

When the decision button 303 of the remote control 100 is pressed, an infrared signal corresponding to the decision button 303 is transmitted from the infrared receiving/emitting unit 4. Upon receiving the signal at the infrared receiving/emitting unit 3, for example, the television 1 finalizes an item that is selected at that point or executes a function selected at that point on a screen displayed on the television screen such as the Electronic Program Guide or the sub menu described above.

When the right button 304 of the remote control 100 is pressed, an infrared signal corresponding to the right button 304 is transmitted from the infrared receiving/emitting unit 4. Upon receiving the signal at the infrared receiving/emitting unit 3, for example, the television 1 selects an item that is immediately right or right by a predetermined number of an item selected at that point on a screen displayed on the television screen such as the Electronic Program Guide or the sub menu described above.

When the down button 305 of the remote control 100 is pressed, an infrared signal corresponding to the down button 305 is transmitted from the infrared receiving/emitting unit 4. Upon receiving the signal at the infrared receiving/emitting unit 3, for example, the television 1 selects an item that is immediately below or below by a predetermined number of an item selected at that point on a screen displayed on the television screen such as the Electronic Program Guide or the sub menu described above.

Furthermore, in addition to including the Electronic Program Guide function as described above, the television 1 that can be operated by the remote control 100 includes a function for viewing data broadcasting such as news, weather forecasts, and information accompanying programs that are transmitted from a broadcast station. Such the Electronic Program Guide, data broadcasting, and the like can be operated by the up button 301, the left button 302, the right button 304, and the down button 305 of the remote control 100, and also by buttons 401 to 404 color-coded in the four colors of blue, red, green, and yellow.

When the blue button 401 of the remote control 100 is pressed, an infrared signal corresponding to the blue button 401 is transmitted from the infrared receiving/emitting unit 4. Upon receiving the signal at the infrared receiving/emitting unit 3, when the Electronic Program Guide or data broadcasting is being displayed and, at the same time, when some operation has been allocated to the blue button, the television 1 executes the operation.

When the red button 402 of the remote control 100 is pressed, an infrared signal corresponding to the red button 402 is transmitted from the infrared receiving/emitting unit 4. Upon receiving the signal at the infrared receiving/emitting unit 3, when the Electronic Program Guide or data broadcasting is being displayed and, at the same time, when some operation has been allocated to the red button, the television 1 executes the operation.

When the green button 403 of the remote control 100 is pressed, an infrared signal corresponding to the green button 403 is transmitted from the infrared receiving/emitting unit 4. Upon receiving the signal at the infrared receiving/emitting unit 3, when the Electronic Program Guide or data broadcasting is being displayed and, at the same time, when some operation has been allocated to the green button, the television 1 executes the operation.

When the yellow button 404 of the remote control 100 is pressed, an infrared signal corresponding to the yellow button 404 is transmitted from the infrared receiving/emitting unit 4. Upon receiving the signal at the infrared receiving/emitting unit 3, when the Electronic Program Guide or data broadcasting is being displayed and, at the same time, when some operation has been allocated to the yellow button, the television 1 executes the operation.

Moreover, the television 1 that can be operated by the remote control 100 is capable of receiving broadcasting of different types such as terrestrial digital broadcasting, terrestrial analog broadcasting, BS broadcasting, and CS broadcasting.

When the broadcasting switching button 501 of the remote control 100 is pressed, an infrared signal corresponding to the broadcasting switching button 501 is transmitted from the infrared receiving/emitting unit 4. Upon receiving the signal at the infrared receiving/emitting unit 3, the television 1 switches to a next broadcasting which has been set according to a predetermined order and which differs in type from the broadcasting viewed before the button was pressed.

When the data broadcasting button 502 of the remote control 100 is pressed, an infrared signal corresponding to the data broadcasting button 502 is transmitted from the infrared receiving/emitting unit 4. Upon receiving the signal at the infrared receiving/emitting unit 3, as described earlier, the television 1 displays a data broadcasting screen for displaying news, weather forecasts, information accompanying programs, and the like that are transmitted from a broadcast station. In addition, in a case where the data broadcasting screen is already being viewed, viewing is terminated and a screen prior to viewing data broadcasting or a predetermined normal-state screen (for example, a terrestrial digital broadcasting viewing screen) is restored.

According to the functions or arrangements of the respective buttons 101 to 502, the remote control 100 according to the present first embodiment is divided into five groups, namely, group A, group B, group C, group D, and group E.

Figure 3:
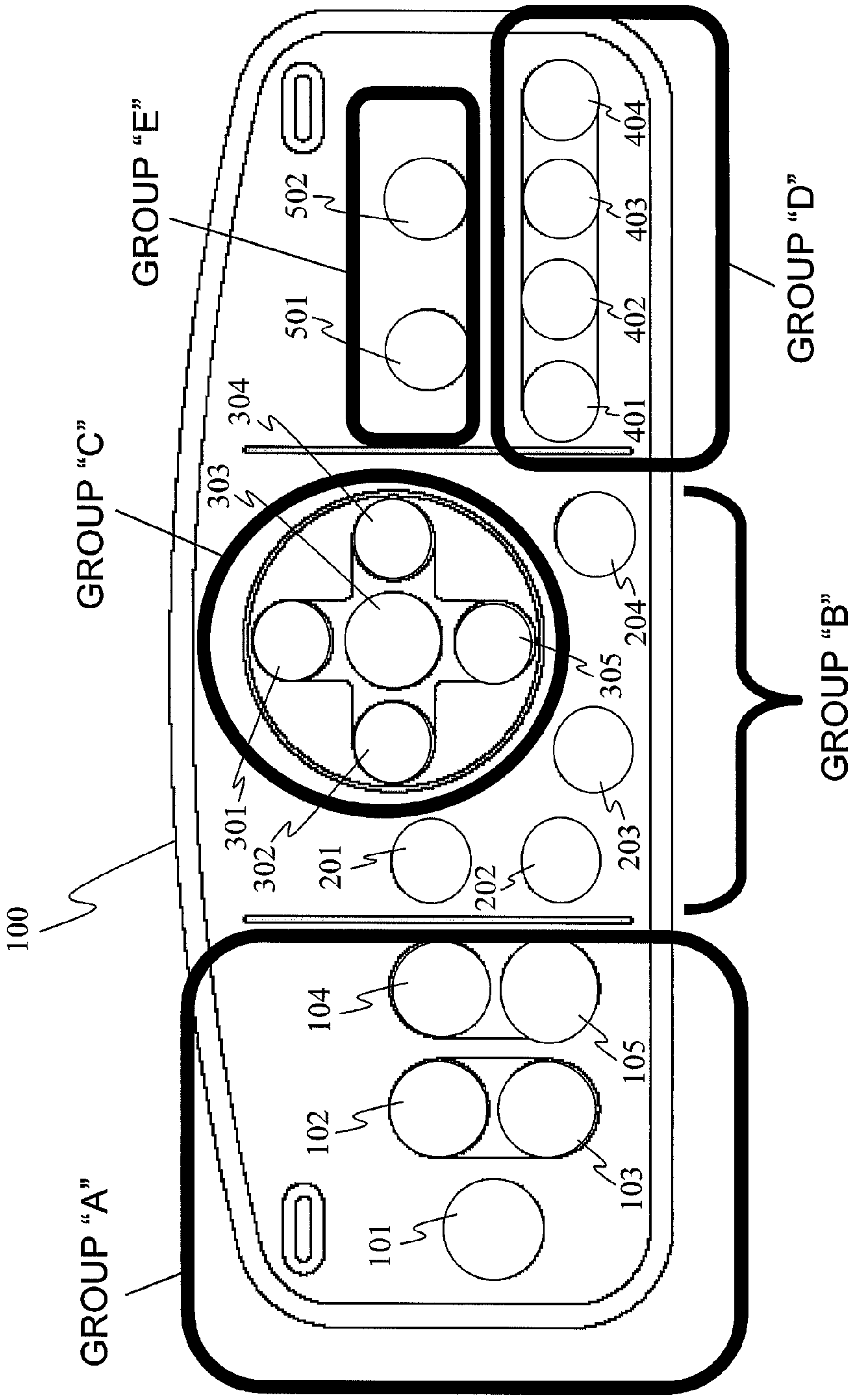
FIG. 3 is an overview for describing groups to which belong respective buttons of the remote control according to the first embodiment of the present invention.

FIG. 3 illustrates an overview for describing the groups of buttons of the remote control 100.

Group A includes the power button 101, the channel up button 102, the channel down button 103, the volume up button 104, and the volume down button 105.

Group B includes the link button 201, the program list button 202, the sub menu button 203, and the return button 204.

Group C includes the up button 301, the left button 302, the decision button 303, the right button 304, and the down button 305.

Group D includes the blue button 401, the red button 402, the green button 403, and the yellow button 404.

Group E includes the broadcasting switching button 501 and the data broadcasting button 502.

In addition, LEDs (Light Emitting Diodes) are respectively provided in the vicinity of the buttons 101 to 502 of the remote control 100. The LEDs are to be lighted in a predetermined state and illuminates the vicinity of a button or a periphery of the button so as to differentiate a lighted button from buttons that are not lighted.

The television 1 corresponds to an example of an operation object device according to the present invention. In addition, the respective buttons 101 to 502 provided on the remote control 100 correspond to an example of keys for operating an operation object device according to the present invention, and the LEDs provided in the vicinity of the respective buttons correspond to light-emitting units according to the present invention.

Figure 4:
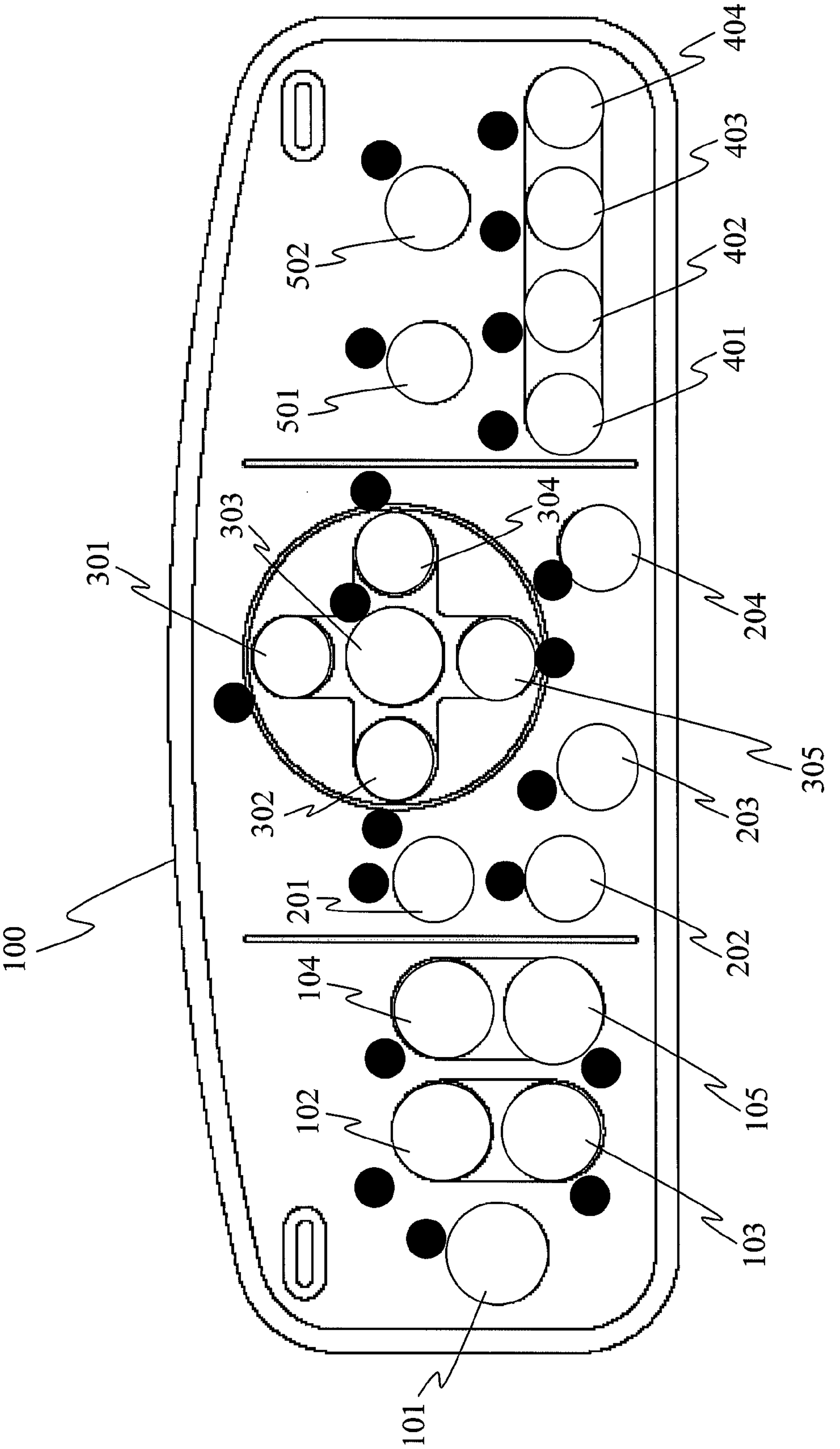
FIG. 4 is a diagram illustrating LEDs provided according to and in the vicinity of the respective buttons of the remote control, according to the first embodiment of the present invention.

FIG. 4 is an overview of the remote control 100 illustrating LEDs provided in the vicinity of the buttons of the remote control 100.

In FIG. 4, a black dot illustrated above, to the left, to the right, or below each button indicates an LED corresponding to the nearest button.

Furthermore, the remote control 100 includes an external switch connecting unit to which the external switch 2 can be connected.

Examples of the external switch 2 include switches generally used by disabled people whose movement of upper limbs is limited such as a large-sized switch albeit with a simple button-shape and a switch utilizing air pressure on which an entire hand is placed and which is capable of sensing delicate movement of parts of the hand.

The remote control 100 according to the present first embodiment can also be operated using such an external switch 2.

In the present first embodiment, a description will be given on operations in a case where the external switch 2 is connected to the remote control 100 and the remote control 100 is operated by the external switch 2 as illustrated in FIG. 1.

Moreover, the television 1 that can be operated by the remote control 100 includes a transmitting unit that transmits, to the remote control 100, states of the television 1 and, in particular, transitional states and display states of screens of functions, setting screens, and the like that can be operated by the remote control 100. Meanwhile, the remote control 100 includes a receiving unit that receives transitional states and display states of screens of functions, setting screens, and the like that can be operated of the television 1 that are transmitted from the television 1.

Due to the transmitting unit included in the television 1 and the receiving unit included in the remote control 100, the remote control 100 can detect what kind of state screen transition or display of the television 1 is in. Accordingly, the remote control 100 controls lighting of the respective LEDs.

Structures of, and a format of data to be transmitted and received by, the transmitting unit included in the television 1 and the receiving unit included in the remote control 100 may take any form as long as transitional states and display states of screens of functions, setting screens, and the like of the television 1 can be notified to the remote control 100. For example, the infrared receiving/emitting unit 3 of the television 1 and the infrared receiving/emitting unit 4 of the remote control 100 may respectively be used as the transmitting unit included in the television and the receiving unit included in the remote control 100.

Figure 5:
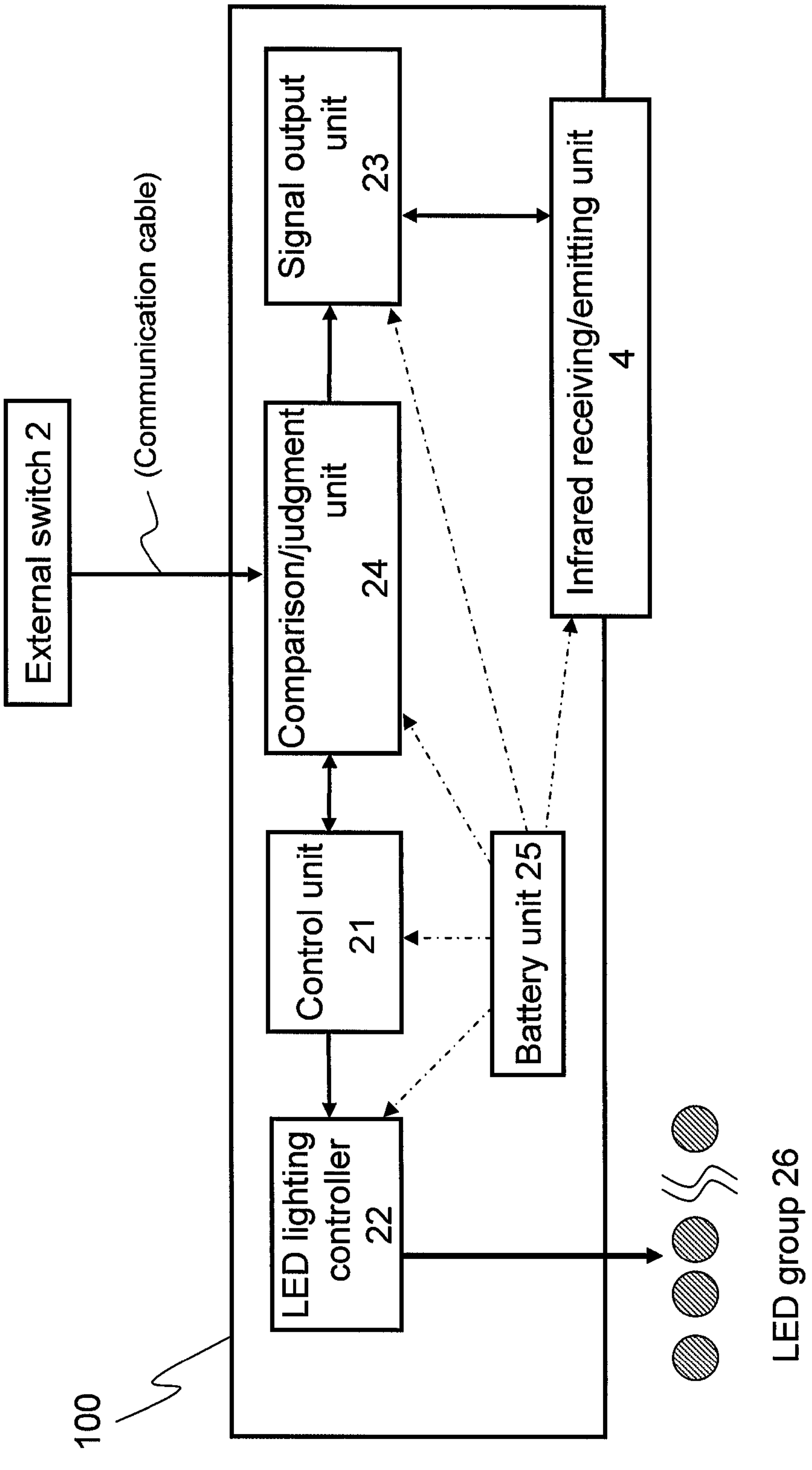
FIG. 5 is a block diagram illustrating an internal configuration of the remote control according to the first embodiment of the present invention.

FIG. 5 is a block diagram illustrating an internal configuration of the remote control 100 according to the present first embodiment.

The remote control 100 is configured so as to internally include the respective units of a control unit 21, an LED lighting controller 22, a signal output unit 23, the infrared receiving/emitting unit 4, a comparison/judgment unit 24, and a battery unit 25. The control unit 21, the LED lighting controller 22, the signal output unit 23, the infrared receiving/emitting unit 4, and the comparison/judgment unit 24 are all supplied driving power from the battery unit 25.

The control unit 21 transmits an LED lighting instruction to the LED lighting controller 22.

Upon receiving the LED lighting instruction, the LED lighting controller 22 repetitively lights the respective LEDs corresponding to the buttons 101 to 502 a predetermined number of times in a predetermined pattern for each constant period of time T.

A signal from the external switch 2 is inputted to the comparison/judgment unit 24 via a communication cable. The comparison/judgment unit 24 compares a signal inputted from the external switch 2 with a signal indicating a light-emitting state of an LED group 26 at that point obtained from the control unit 21, and depending on a judgment result thereof, outputs an instruction signal to the control unit 21 or the signal output unit 23.

The LED lighting controller 22 corresponds to an example of a lighting control unit according to the present invention. In addition, the control unit 21 corresponds to an example of a first control unit and a second control unit according to the present invention and is equipped with functions of both the first control unit and the second control unit according to the present invention. Furthermore, the external switch 2 corresponds to an example of a first selecting unit and a second selecting unit according to the present invention and is equipped with functions of both the first selecting unit and the second selecting unit according to the present invention.

Moreover, the comparison/judgment unit 24 corresponds to an example of a first comparison/judgment unit and a second comparison/judgment unit according to the present invention and is equipped with functions of both the first comparison/judgment unit and the second comparison/judgment unit according to the present invention.

Now, let us assume that the comparison/judgment unit 24 has received a signal from the external switch 2 and, according to a judgment result of the comparison/judgment unit 24, the control unit 21 is issuing a lighting instruction to the LED lighting controller 22. In addition, as the comparison/judgment unit 24 once again receives a signal from the external switch 2, the comparison/judgment unit 24 causes the control unit 21 to transmit a next LED lighting instruction to the LED lighting controller 22 in accordance with pattern information of LEDs lighted at that time obtained from the control unit 21, and causes the signal output unit 23 to transmit a command to emit a corresponding infrared signal. When receiving the command to emit an infrared signal from the comparison/judgment unit 24, the signal output unit 23 emits an infrared signal via the infrared receiving/emitting unit 4.

The present first embodiment is designed such that the respective buttons 101 to 502 from group A to group E illustrated in FIG. 3 are lighted per group at a predetermined time interval and in a predetermined order, and when any of the groups A to E is selected, the respective buttons within the selected group are lighted at a predetermined time interval and in a predetermined order.

Hereinafter, basic LED lighting specifications of the present first embodiment will be described with reference to the drawings.

Figure 6:
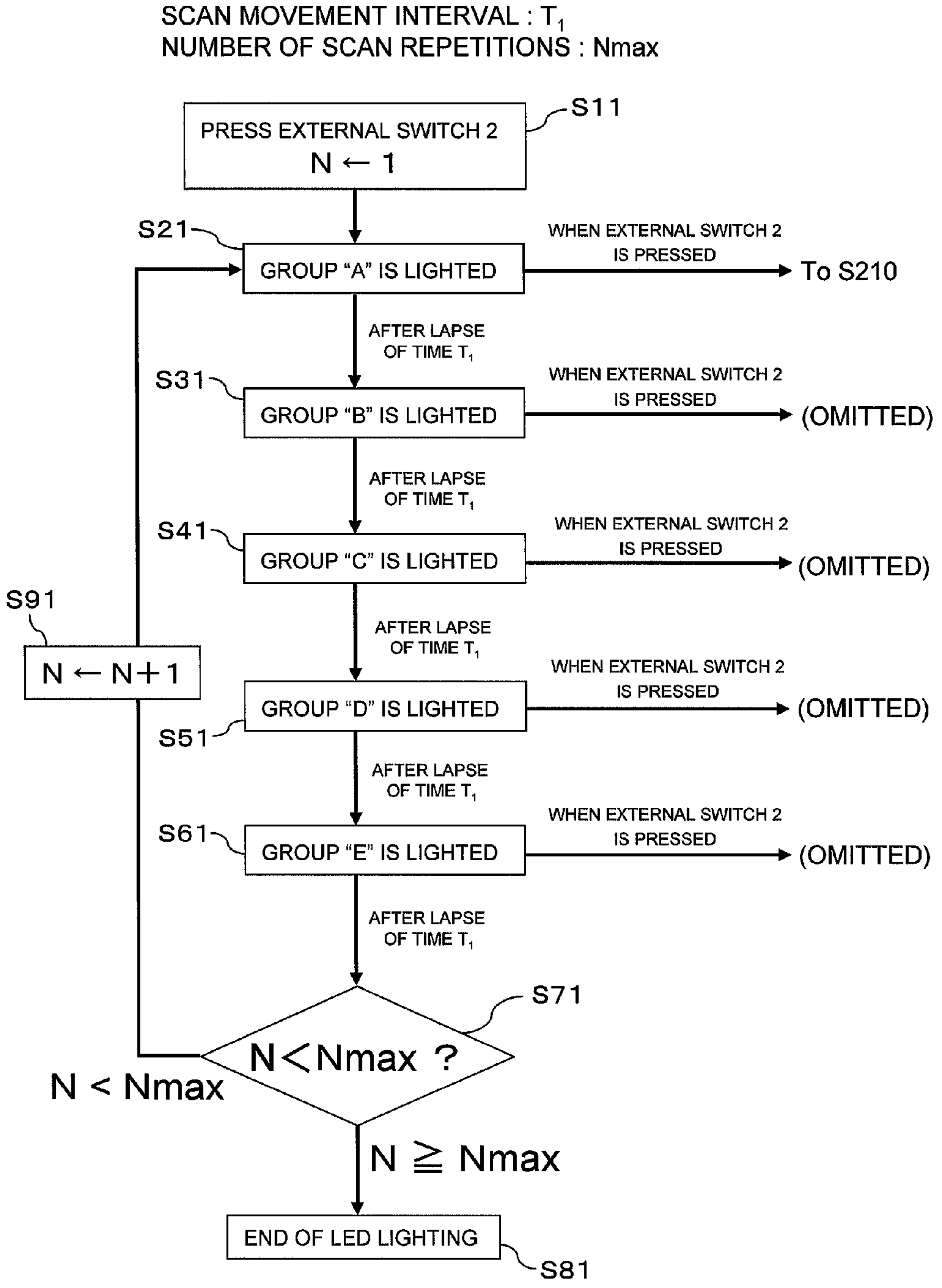
FIG. 6 is a diagram illustrating a lighting control flow of LEDs for each group in the remote control according to the first embodiment of the present invention.
Figure 7:
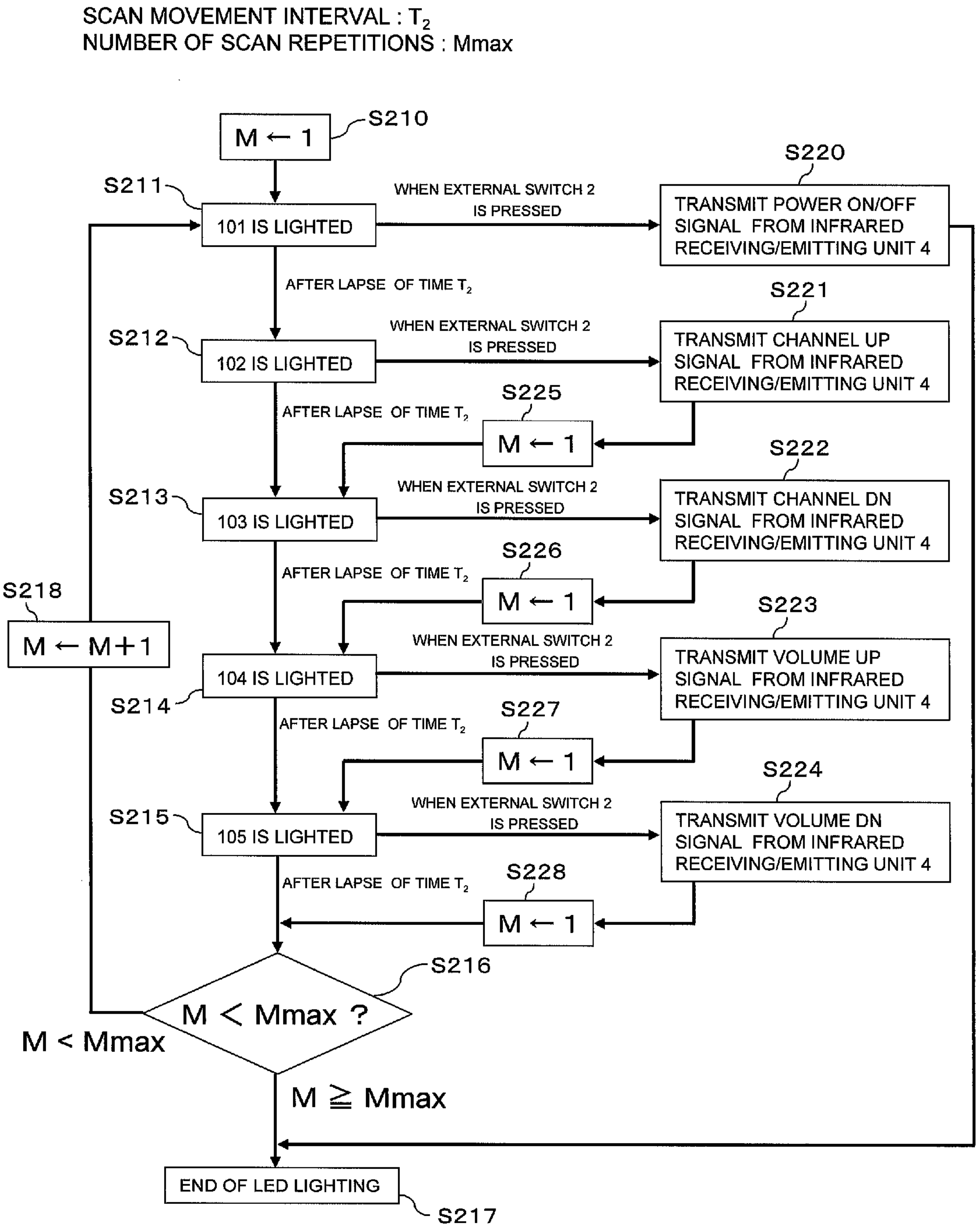
FIG. 7 is a diagram illustrating a lighting control flow of an individual LED in the remote control according to the first embodiment of the present invention.

FIG. 6 and FIG. 7 illustrate flowcharts representing movements of respective LEDs in the LED group 26 of the remote control 100 and movements until an infrared signal is transmitted from the remote control 100 to the television 1 according to the present first embodiment.

Figure 8:
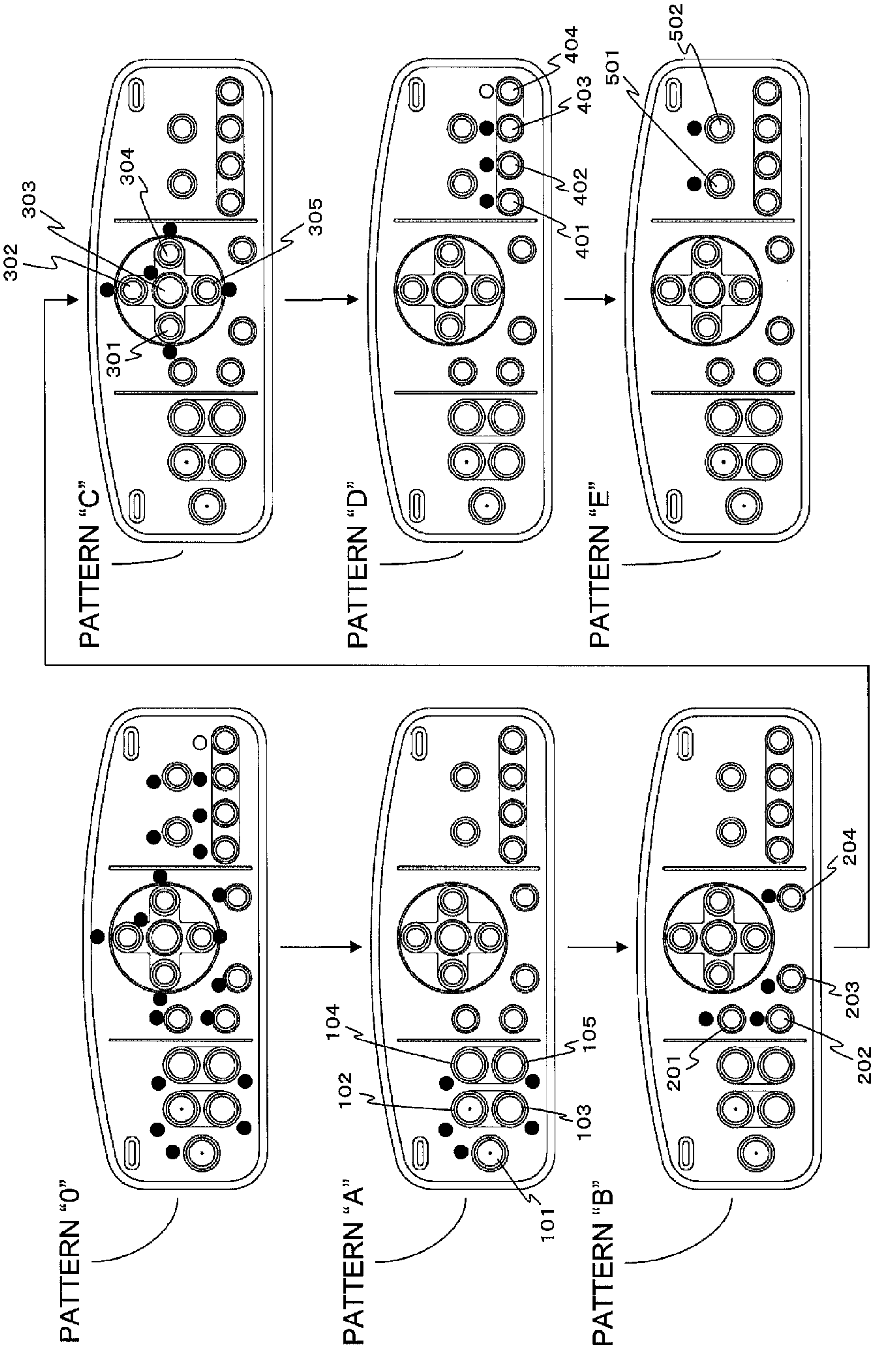
FIG. 8 is a diagram for describing lighting operations of LEDs per group in the remote control according to the first embodiment of the present invention.

In addition, FIG. 8 illustrates a diagram for describing lighting operations of the respective LEDs according to the present first embodiment. The respective patterns (pattern 0, patterns A to E) illustrated in FIG. 8 denote lighted LEDs by block dots. LEDs without black dots are those which are not lighted at that time.

First, in FIG. 6, when the power of the television 1 is turned off, all LEDs of the remote control 100 are not lighted.

When the external switch 2 is operated in this state, the television 1 is turned on, all LEDs of the remote control 100 are lighted for each predetermined amount of time (pattern 0 in FIG. 8), and all LEDs are turned off after notifying activation of the television 1.

Inside the remote control 100, the number of scan repetitions (Nmax) that is the number of times group A to group E are repetitively lighted and a scan movement interval $T_1$ are set in advance. The scan movement interval $T_1$ is set using a scan speed adjustment function (not shown) or the like provided in the remote control 100.

At this point, by pressing the external switch 2 once (step S11), the number of scan repetitions is set to N=1 and LEDs of group A maintain a lighted state for time $T_1$ (step S21).

After a lapse of time $T_1$, the LEDs of group A are turned off and the LEDs of group B maintain a lighted state (step S31). Subsequently, in a similar manner, the LEDs of group C (step S41), group D (step S51), and group E (step S61) are sequentially turned off and then lighted after lapses of time $T_1$. In other words, lighting is sequentially performed in a sequence of pattern A to pattern E as illustrated in FIG. 8.

After a lapse of time $T_1$ after the LEDs of group E are lighted, numerical values of the number of scan repetitions N and Nmax are compared (step S71). If N<Nmax, then 1 is added to N (step S91) and the operation state returns to step S21, and if N≧Nmax, then scan is terminated and all LEDs are turned off (step S81).

Moreover, the flow illustrated in FIG. 6 may be arranged such that when the external switch 2 is operated twice within a short constant period of time determined in advance, all LEDs are turned off and the operation state of LEDs in the remote control 100 transitions to step S81.

Figure 9:
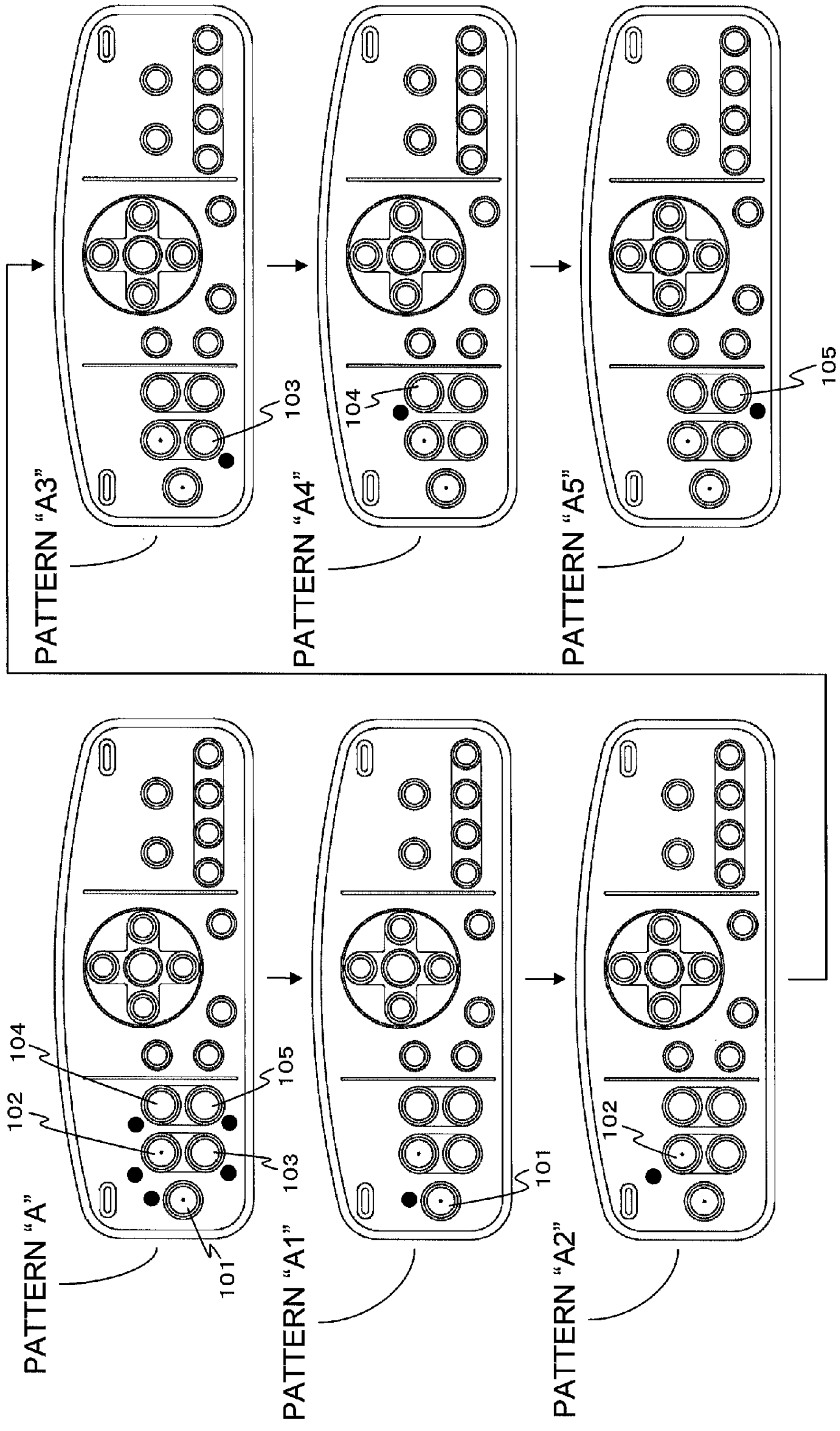
FIG. 9 is a diagram for describing a lighting operation of LEDs of group A in the remote control according to the first embodiment of the present invention.

FIG. 9 illustrates a diagram for describing lighting operations of the respective LEDs after group A has been selected. In the same manner as in FIG. 8, only lighted LEDs are denoted by black dots.

When the external switch 2 is pressed during lighting of the LEDs of group A (step S21), it is determined that group A has been selected and the operation state jumps to step S210 in FIG. 7.

Inside the remote control 100, the number of scan repetitions (Mmax) that is the number of times LEDs of the respective buttons in a group are repetitively lighted and a scan movement interval $T_2$ are set in advance. The scan movement interval $T_2$ is set using the scan speed adjustment function or the like provided in the remote control 100.

In step S210, the number of scan repetitions for lighting LEDs of the respective buttons in a group is set to M=1 and the LED of the power button 101 maintains a lighted state for time $T_2$ (step S211).

After a lapse of time $T_2$, the LED of the power button 101 is turned off and the LED of the channel up button 102 similarly maintains a lighted state for time $T_2$ (step S212). Subsequently, in a similar manner, the LED of the channel down button 103 (step S213), the LED of the volume up button 104 (step S214), and the LED of the volume down button 105 (step S215) are sequentially turned off and then lighted after lapses of time $T_2$. In other words, lighting is sequentially performed in a sequence of pattern A1 to pattern A5 as illustrated in FIG. 9.

After a lapse of time $T_2$ after the LED of the volume down button 105 is lighted, numerical values of the number of scan repetitions M and Mmax are compared (step S216). If M<Mmax, then 1 is added to M (step S218) and the operation state returns to step S211, and if M≧Mmax, then scan is terminated and all LEDs are turned off (step S217).

When the external switch 2 is operated after all LEDs have been turned off, processing of step S11 and thereafter is performed and a repetitive lighting operation of LEDs per group is recommenced.

Moreover, the flow illustrated in FIG. 7 may be arranged such that when the external switch 2 is operated twice within a short constant period of time determined in advance during repetitions of the LED lighting patterns A1 to A5 illustrated in FIG. 9, the operation state returns to step S21 in FIG. 6 (pattern A in FIG. 8). In addition, when returning to step S21, the operation state may be arranged so as to return to step S21 after resetting the number of scan repetitions from group A to group E to N=1.

By adopting such a measure, a transition can now be made to another group without having to await the conclusion of the lighting of LEDs of buttons in a group.

In addition, an arrangement may be adopted where, when the external switch 2 is operated twice within a short constant period of time determined in advance, the LED lighting process is terminated (step S217) instead of returning to step S21 in FIG. 6. The operation in this case may be arranged so as to be settable either to return to step S21 or to terminate the LED lighting process.

When the external switch 2 is pressed once again when the LED of the power button 101 is lighted (step S211), the comparison/judgment unit 24 judges that the power button 101 has been selected and notifies the signal output unit 23, and a power ON/OFF signal corresponding to the power button 101 is transmitted from the remote control-side infrared receiving/emitting unit 4 (step S220). In this case, power of the television 1 having received the power ON/OFF signal is turned off and all LEDs of the remote control 100 are also turned off (step S217).

In a similar manner, when it is determined that the channel up button 102 has been selected, a channel UP signal is transmitted from the remote control-side infrared receiving/emitting unit 4 (step S221), when it is determined that the channel down button 103 has been selected, a channel DN signal is transmitted from the remote control-side infrared receiving/emitting unit 4 (step S222), when it is determined that the volume up button 104 has been selected, a volume UP signal is transmitted from the remote control-side infrared receiving/emitting unit 4 (step S223), and when it is determined that the volume down button 105 has been selected, a volume DN signal is transmitted from the remote control-side infrared receiving/emitting unit 4 (step S224).

Figure 10:
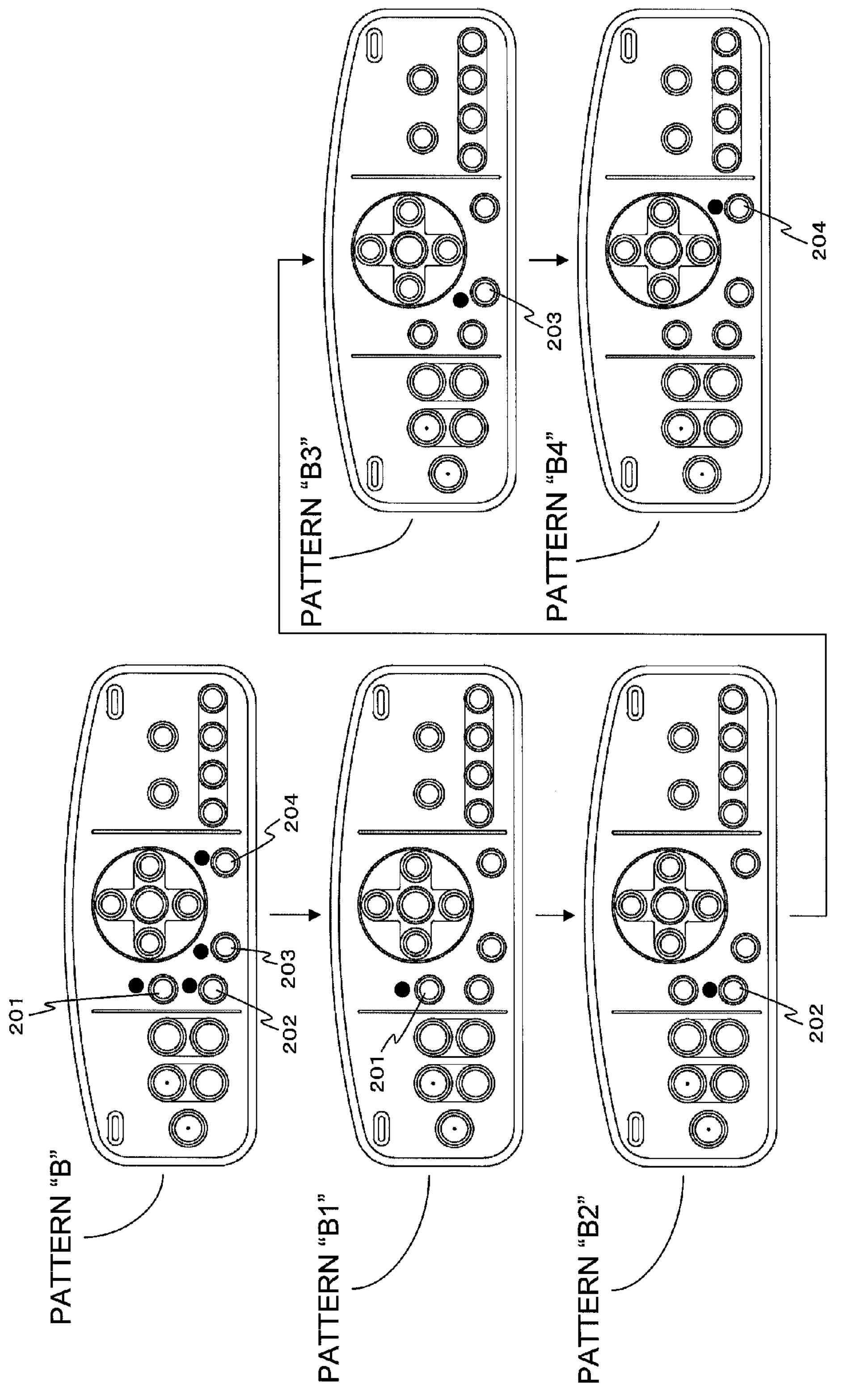
FIG. 10 is a diagram for describing a lighting operation of LEDs of group B in the remote control according to the first embodiment of the present invention.

FIG. 10 illustrates a diagram for describing lighting operations of the respective LEDs after group B has been selected. In a similar manner, FIG. 11, FIG. 12, and FIG. 13 respectively illustrate diagrams for describing lighting operations of the respective LEDs after group C, group D, and group E have been selected. In FIGS. 10 to 13, only lighted LEDs are denoted by black dots in the same manner as in FIG. 8.

When any one of groups B to E is selected in FIG. 6, operations similar to the aforementioned operations performed upon selection of group A are performed.

Figure 11:
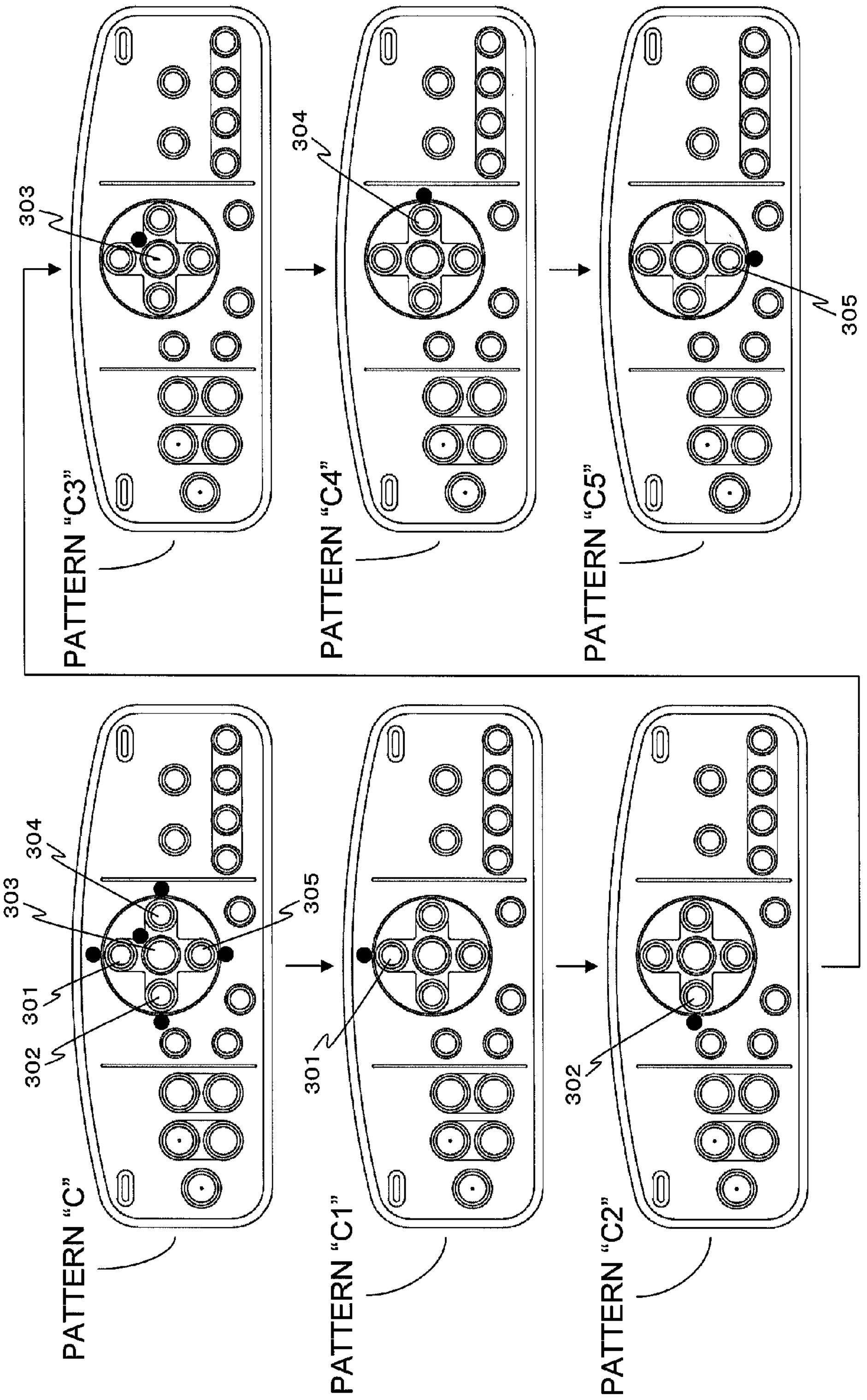
FIG. 11 is a diagram for describing a lighting operation of LEDs of group C in the remote control according to the first embodiment of the present invention.
Figure 12:
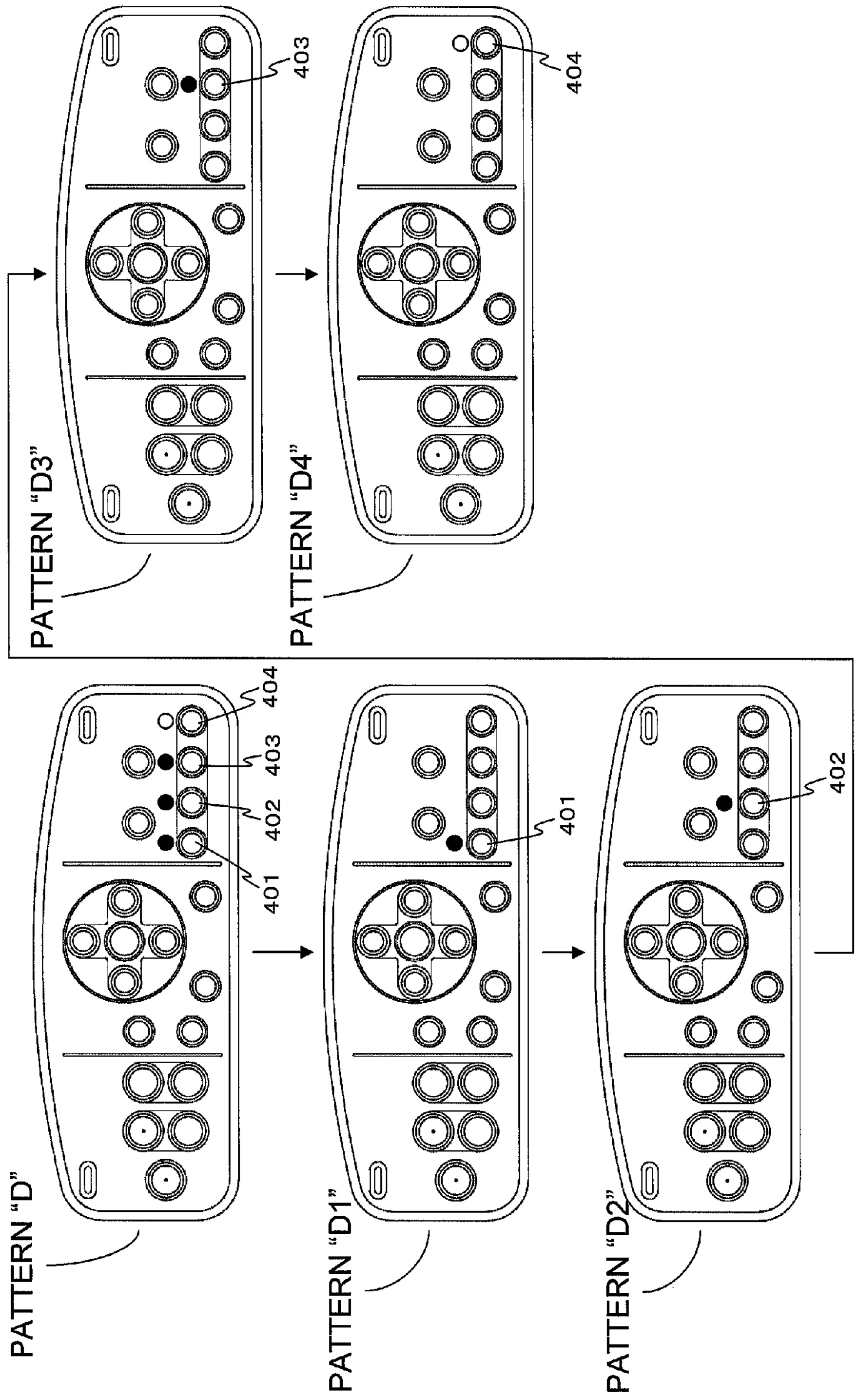
FIG. 12 is a diagram for describing a lighting operation of LEDs of group D in the remote control according to the first embodiment of the present invention.
Figure 13:
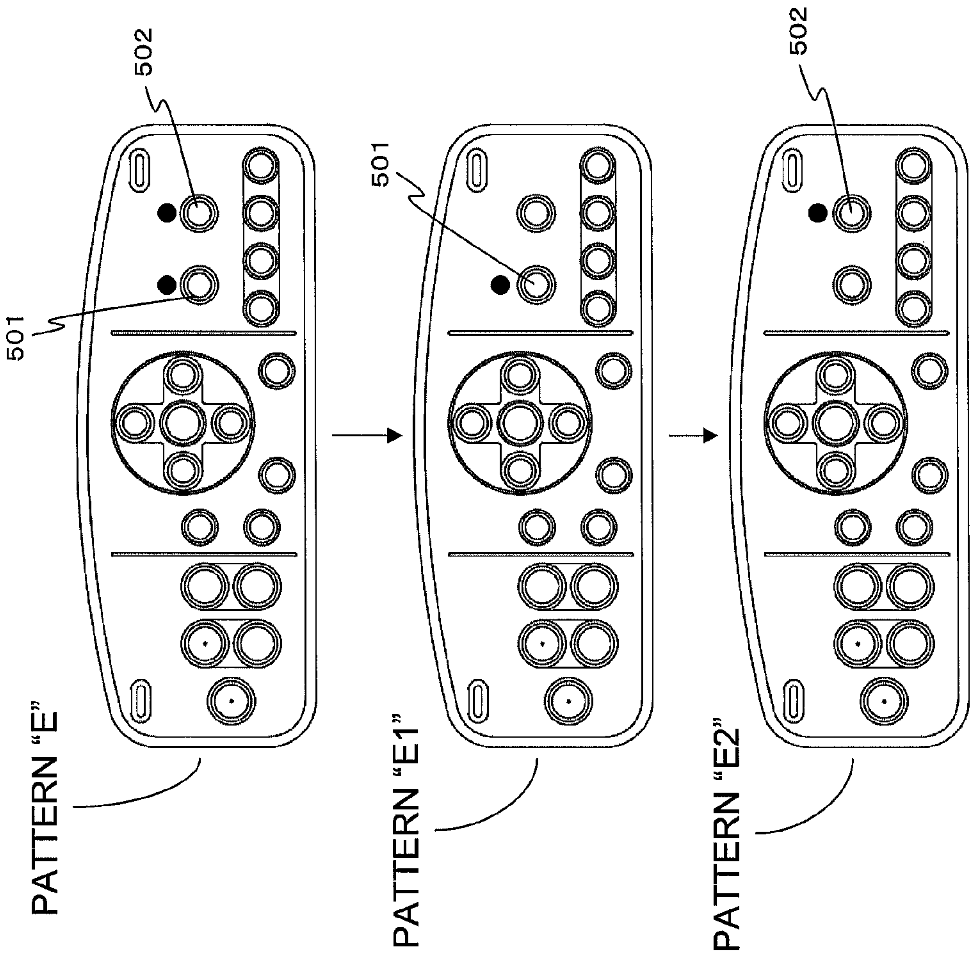
FIG. 13 is a diagram for describing a lighting operation of LEDs of group E in the remote control according to the first embodiment of the present invention.

In other words, in FIG. 6, when group B is selected in step S31, LEDs are sequentially lighted as a repetition of pattern B1 to pattern B4 illustrated in FIG. 10, when group C is selected in step S41, LEDs are sequentially lighted as a repetition of pattern C1 to pattern C5 illustrated in FIG. 11, when group D is selected in step S51, LEDs are sequentially lighted as a repetition of pattern D1 to pattern D4 illustrated in FIG. 12, and when group E is selected in step S61, LEDs are sequentially lighted as a repetition of pattern E1 to pattern E2 illustrated in FIG. 13. In addition, when a further selection is made by the external switch 2, infrared signals corresponding to the respective buttons 201 to 502 are transmitted from the remote control-side infrared receiving/emitting unit 4.

Next, as a specific example, a flow of processing will be described of a case where a user uses the remote control 100 according to the present first embodiment to turn on the television 1 and operate channels, and subsequently operates the volume, selects a channel to be viewed, and adjusts sound outputted from the television 1 to an appropriate level.

First, when the external switch 2 is operated when power of the television 1 has been turned off, the comparison/judgment unit 24 notifies the signal output unit 23 of information to the effect that the power button 101 has been selected, the signal output unit 23 transmits a power ON/OFF signal corresponding to the power button 101 from the remote control-side infrared receiving/emitting unit 4, and the television 1 is turned on. At the same time, the comparison/judgment unit 24 also notifies the control unit 21 of information to the effect that the power button 101 has been selected, the control unit 21 inputs, to the LED lighting controller 22, a lighting command signal that causes all LEDs corresponding to all buttons 101 to 502 of the remote control 100 to be lighted for a constant period of time determined in advance, and all LEDs are lighted. In other words, LEDs are lighted as indicated by the pattern 0 in FIG. 8.

Next, the LED group 26 of the remote control 100 is turned off and lighted according to the flow illustrated in FIG. 6, and as illustrated in FIG. 8, LEDs corresponding to the respective buttons in group A to group E are sequentially lighted.

Now, let us assume that the channel of the television 1 had been set to channel 2 at the moment power of the television 1 is turned on and that the user is to change the channel to channel 4.

While looking at the remote control 100 on which LEDs in group A to group E are being sequentially lighted, the user operates the external switch 2 in a state where LEDs of group A are being lighted.

When the external switch 2 is operated in a state where LEDs of group A are being lighted, as illustrated in FIG. 9, the remote control 100 switches to a mode in which LEDs corresponding to the respective buttons 101 to 105 of group A are sequentially lighted.

With a desire to operate the channel up button 102 that is required to change the channel of the television 1 from channel 2 to channel 4, while looking at the remote control 100 on which LEDs corresponding to the respective buttons 101 to 105 in group A are being lighted for each constant period of time, the user operates the external switch 2 in a state where the LED of the channel up button 102 is being lighted.

When the external switch 2 is operated in a state where the LED of the channel up button 102 is being lighted (step S212), the comparison/judgment unit 24 notifies the signal output unit 23 of information to the effect that the channel up button 102 has been selected, and the signal output unit 23 causes a remote control signal that instructs channel UP (channel UP signal) to be transmitted from the remote control-side infrared receiving/emitting unit 4 to the television-side infrared receiving/emitting unit 3 of the television 1 (step S221). At the same time, the control unit 21 is also notified by the comparison/judgment unit 24 of information to the effect that the channel up button 102 has been selected, and the control unit 21 outputs a lighting command signal to the LED lighting controller 22 and causes the LED of the channel up button 102 to be lighted for a constant period of time determined in advance (referred to as a lighting holding time). A lighting holding time during which an LED of a selected button is lighted for a constant period of time after the external switch 2 is operated can be changed according to settings.

After lighting the LED of the channel up button 102 for the lighting holding time, the control unit 21 resets the number of scan repetitions of lighting of the LEDs of the respective buttons in the group to M=1 (step S235), and once again returns to the mode where LEDs corresponding to the respective buttons 101 to 105 in group A are sequentially lighted (FIG. 9). In a similar manner, when any one of the other buttons 103 to 105 is selected, the LED of the button is lighted for the lighting holding time (steps S226 to S228), the number of scan repetitions is subsequently reset to M=1, and the mode where LEDs corresponding to the respective buttons 101 to 105 in group A are sequentially lighted is once again restored.

Next, with a desire to raise the volume of sound outputted from the television 1, while looking at the remote control 100 on which LEDs corresponding to the respective buttons 101 to 105 in group A are being lighted for each constant period of time, the user operates the external switch 2 in a state where the LED of the volume up button 104 is being lighted.

When the external switch 2 is operated in a state where the LED of the volume up button 104 is being lighted (step S214), the comparison/judgment unit 24 notifies the signal output unit 23 of information to the effect that the volume up button 104 has been selected, and the signal output unit 23 causes a remote control signal that instructs volume UP (volume UP signal) to be transmitted from the remote control-side infrared receiving/emitting unit 4 to the television-side infrared receiving/emitting unit 3 of the television 1 (step S223). At the same time, the control unit 21 is also notified by the comparison/judgment unit 24 of information to the effect that the volume up button 104 has been selected, and the control unit 21 outputs a lighting command signal to the LED lighting controller 22 and causes the LED of the volume up button 104 to be lighted for the lighting holding time.

When the user wishes to repeat operations of the channel or volume of the television 1, the user repeats the operations described above.

Due to the operations described above, the user can change the channel or volume of the television as desired using the external switch 2 that only accepts specific predetermined operations.

Moreover, in the example described above, while the same button such as the channel up button 102 or the volume up button 104 must be consecutively selected when changing to a distant channel or when significantly changing the volume, since only one time can be selected during one scan of LEDs sequentially lighted in group A, a change to a desired channel or volume may be time-consuming.

In consideration thereof, an arrangement can be adopted in which by having the comparison/judgment unit 24 perform control on the assumption that the button of the lighted LED is once again selected when the external switch 2 is operated during the lighting holding time during which the LED of the selected button is being lighted, a continuous operation of the same button can be performed in a short period of time by operating the external switch 2. For example, when the channel up button 102 has been selected, by operating the external switch 2 once or a plurality of times during the lighting holding time after selection during which the LED of the channel up button 102 is being lighted, the channel can be consecutively changed in a short period of time. Moreover, when the external switch 2 is operated during a lighting holding time, the lighting of the LED of the button is controlled so as to be performed for a new lighting holding time from the moment the operation is performed.

By adopting such a measure, operations of buttons that must be consecutively pressed within a series of operations such as the volume up and down buttons, the channel up and down buttons, and the up, down, left, and right buttons can now be performed without having to await a loop of LED lighting.

While it has been described above with reference to the flow illustrated in FIG. 7 that a configuration may be adopted in which the flow returns to step S21 illustrated in FIG. 6 when the external switch 2 is operated twice during a short constant period of time determined in advance, both "an operation for returning to sequential lighting among groups" and "consecutive operations on the same button" can be accommodated by distinguishing cases where the external switch 2 is consecutively operated according to time intervals of consecutive operations.

For example, both operations can be accommodated by determining consecutive operations of the external switch 2 where the interval of the consecutive operations is within a short constant period of time (for example, 0.3 seconds) determined in advance to be "an operation for returning to sequential lighting among groups", and determining a consecutive operation of the external switch 2 where the interval of the consecutive operations is greater than the constant period of time (0.3 seconds) but within the lighting holding time to be "a consecutive operation on the same button".

In addition, when directly operating buttons of the remote control 100, the channel up button 102, the volume up button 104, or the like can be continuously pressed so as to continuously change the channel or volume in stages. Therefore, a change to a desired channel or volume can be similarly made in a short period of time by having a signal similar to a case of a long press of a button transmitted to the television-side infrared receiving/emitting unit 3 in response to an operation of the external switch 2. For example, when the external switch 2 is continuously pressed, an emission from the infrared receiving/emitting unit 4 of a signal similar to that when the button selected at that time is continuously pressed for the same amount of time during which the external switch 2 is pressed can be realized through control of the comparison/judgment unit 24. By adopting such an arrangement, for example, by continuously pressing the external switch 2 during lighting of the LED of the channel up button 102, the channel can be continuously changed in stages.

As a next specific example, a flow of processing will be described for a case where the user currently viewing the television 1 uses the remote control 100 according to the present first embodiment to view Program Guide, and after selecting a desired program and confirming program contents, sets a viewing reservation.

First, when the external switch 2 is operated in a state where the television 1 is viewed, the comparison/judgment unit 24 notifies the control unit 21 of information on start of control by the operation of the external switch 2, whereby the control unit 21 inputs, to the LED lighting controller 22, a signal that causes all LEDs corresponding to all buttons 101 to 502 of the remote control 100 to be lighted for each constant period of time determined in advance, and all LEDs are lighted. In other words, LEDs are lighted as indicated by the pattern 0 in FIG. 8.

Next, in the LED group 26 of the remote control 100, LEDs corresponding to the respective buttons in group A to group E are sequentially lighted as illustrated in FIG. 8.

At this point, while looking at the remote control 100 on which LEDs in group A to group E are being sequentially lighted, the user operates the external switch 2 in a state where LEDs of group B to which the program list button 202 belongs are lighted.

When the external switch 2 is operated in a state where LEDs of group B are lighted, as illustrated in FIG. 10, the remote control 100 switches to a mode in which LEDs corresponding to the respective buttons 201 to 204 of group B are sequentially lighted.

With a desire to operate the program list button 202 that is required to activate the Program Guide function of the television 1, while looking at the remote control 100 on which LEDs corresponding to the respective buttons 201 to 204 in group B are being lighted for each constant period of time, the user operates the external switch 2 in a state where the LED of the program list button 202 is being lighted.

When the external switch 2 is operated in a state where the LED of the program list button 202 is being lighted, the comparison/judgment unit 24 notifies the signal output unit 23 of information to the effect that the program list button 202 has been selected, and the signal output unit 23 causes a remote control signal that instructs activation of a Program Guide to be transmitted from the remote control-side infrared receiving/emitting unit 4 to the television. At the same time, the control unit 21 is also notified by the comparison/judgment unit 24 of information to the effect that the program list button 202 has been selected, and the control unit 21 outputs a lighting command signal to the LED lighting controller 22 and causes the LED of the program list button 202 to be lighted for a lighting holding time that is a constant period of time determined in advance.

After lighting the LED of the program list button 202 for the lighting holding time, based on the state of the television screen obtained from the television 1, the control unit 21 next switches to a mode for sequentially lighting LEDs corresponding to the respective buttons 301 to 305 of group C which either must be operated next or are likely to be operated next (a mode illustrated in FIG. 11).

With a desire to operate a cursor in the Program Guide displayed on the screen of the television 1 once rightward and once downward in order to select a desired program, while looking at the remote control 100 on which LEDs corresponding to the respective buttons 301 to 305 in group C are being lighted for each constant period of time, the user operates the external switch 2 in a state where the LED of the right button 304 is being lighted.

When the external switch 2 is operated in a state where the LED of the right button 304 is being lighted, the comparison/judgment unit 24 notifies the signal output unit 23 of information to the effect that the right button 304 has been selected, and the signal output unit 23 causes a remote control signal that moves the cursor of the Program Guide rightward to be transmitted to the television 1. At the same time, the control unit 21 is also notified by the comparison/judgment unit 24 of information to the effect that the right button 304 has been selected, and the control unit 21 outputs a lighting command signal to the LED lighting controller 22 and causes the LED of the right button 304 to be lighted for the lighting holding time.

After lighting the LED of the right button 304 for the lighting holding time, based on the state of the television screen obtained from the television 1, the control unit 21 subsequently repeats the mode for sequentially lighting LEDs corresponding to the respective buttons 301 to 305 of group C which either must be operated next or are likely to be operated next (the mode illustrated in FIG. 11).

Subsequently, while looking at the remote control 100 on which LEDs corresponding to the respective buttons 301 to 305 in group C are being lighted for each constant period of time, the user operates the external switch 2 in a state where the LED of the down button 305 is being lighted.

When the external switch 2 is operated in a state where the LED of the down button 305 is being lighted, the comparison/judgment unit 24 notifies the signal output unit 23 of information to the effect that the down button 305 has been selected, and the signal output unit 23 causes a remote control signal that moves the cursor of the Program Guide downward to be transmitted to the television 1. At the same time, the control unit 21 is also notified by the comparison/judgment unit 24 of information to the effect that the down button 305 has been selected, and the control unit 21 outputs a lighting command signal to the LED lighting controller 22 and causes the LED of the down button 305 to be lighted for the lighting holding time.

After lighting the LED of the down button 305 for the lighting holding time, based on the state of the television screen obtained from the television 1, the control unit 21 subsequently repeats the mode for sequentially lighting LEDs corresponding to the respective buttons 301 to 305 of group C which either must be operated next or are likely to be operated next (the mode illustrated in FIG. 11).

The user repetitively performs similar operations and, finally, with a desire to move a focal point to an item on which the viewing reservation is to be performed on a viewing reservation setting screen of the selected desired program and to press the decision button 303, while looking at the remote control 100 on which LEDs corresponding to the respective buttons 301 to 305 in group C are being lighted for each constant period of time, the user operates the external switch 2 in a state where the LED of the decision button 303 is being lighted.

When the external switch 2 is operated in a state where the LED of the decision button 303 is being lighted, the comparison/judgment unit 24 notifies the signal output unit 23 of information to the effect that the decision button 303 has been selected, and the signal output unit 23 causes a remote control signal that finalizes the item being selected in the Program Guide to be transmitted to the television 1. At the same time, the control unit 21 is also notified by the comparison/judgment unit 24 of information to the effect that the decision button 303 has been selected, and the control unit 21 outputs a lighting command signal to the LED lighting controller 22 and causes the LED of the decision button 303 to be lighted for the lighting holding time.

According to the operations described above, the user can select a desired program from the Program Guide and set a viewing reservation using the external switch 2 without having to directly operate the remote control 100.

In the operation example described above, LEDs are lighted on the premise that only buttons included in group C (the up button 301, the left button 302, the decision button 303, the right button 304, and the down button 305) are to be used when operating the Program Guide. However, a specification may be adopted where, for example, when the blue button 401 or the red button 402 belonging the group D are assigned to operations of the Program Guide, based on a state of the television screen obtained from the television 1, LEDs corresponding to the respective buttons belonging to group C and group D are first alternately lighted, and then LEDs corresponding to the respective buttons belonging to the group selected by the user (in this case, group C or group D) are next sequentially lighted.

Moreover, in the present first embodiment, while the remote control 100 is configured so as to include remote control buttons that can also be directly inputted from the remote control, in a case where operations are limited to those using only the external switch, the present first embodiment can be realized by a labels-only remote control, an indicators-only remote control, and the like which are capable of identifying signals from an external switch without having to use buttons that can be directly pressed.

Furthermore, in the description above, while buttons that can be operated are clearly indicated by turning off LEDs corresponding to buttons that cannot be operated and lighting LEDs corresponding to buttons that can be operated, whether or not an operation can be performed can alternatively be clearly indicated by changing colors or varying brightnesses of the LEDs.

Depending on a display state of the screen of the television 1, there may be buttons on the remote control 100 that cannot be operated (not enabled) even when the buttons are directly pressed. For example, the decision button 303 is not enabled when television broadcasting is being displayed on the screen. At this point, the display state of the screen of the television 1 does not change even if the decision button 303 of the remote control 100 is pressed. On the other hand, there may be buttons that are enabled when directly pressing buttons on the remote control 100 but cannot be operated by the external switch 2. For example, since an erroneous operation of the volume up button 104 may produce a blast of sound which may startle those nearby, the volume up button 104 may be set so as to be unusable through the external switch 2.

When indicating, solely by lighting/turning off an LED, whether or not a button can be operated by the external switch 2, it is indistinguishable as to whether an LED being turned off indicates a button set so as to be unselectable by the external switch 2 at that time or a button that is inoperable even when directly pressing the button on the remote control 100.

In this case, such buttons can be made distinguishable by indicating with different colors, such as indicating a button that is inoperable even when directly pressing the button on the remote control 100 by red, indicating a button that can be selected using the external switch 2 by green, and turning off a button that can be operated with a button of the remote control 100 but cannot be selected using the external switch 2.

In a similar manner, such buttons can be made distinguishable by indicating with different brightnesses, such as dimly lighting an inoperable button, indicating a button selectable using the external switch by brightly lighting the button, and turning off a button whose timing does not allow selection by the external switch.

In addition, as described with reference to the flow illustrated in FIG. 7, when LEDs in a group are being sequentially lighted, a signal corresponding to the button of an LED lighted upon operation of the external switch 2 is outputted from the infrared receiving/emitting unit 4. When the external switch 2 is operated to select the button immediately before the lapse of time $T_2$ from the lighting of the LEDs, only to have lighting switched to a next LED at the moment the external switch 2 is operated, a button that differs from the button that the user had intended to select is to end up being selected.

In order to prevent such erroneous selections, the value of the scan movement interval $T_2$ that is a lighting time of the respective LEDs to be sequentially lighted should be set according to the user. For example, for a user prone to erroneous selections, such erroneous selections can be reduced by increasing the value of the scan movement interval $T_2$.

Furthermore, the remote control 100 may be adapted so as to automatically set the value of the scan movement interval $T_2$ based on operation contents of the user. For example, for each operation of the external switch 2, the period of time from the lighting of an LED to the operation of the external switch 2 is to be stored, whereby a value of the scan movement interval $T_2$ suited to a user is to be calculated and set based on the stored times.

Moreover, in order have the user become more aware of selectable timings by the operation of the external switch 2, a beep sound or the like may be outputted whenever LED lighting is to be switched. The beep sound to be outputted may either be a single beep sound or beep sounds of a musical scale such as “do”, “re”, “mi”, . . . , whereby a different tone is to be outputted for each button.

In addition, the remote control 100 may be provided with an audio output function, whereby the name of a button such as “turn up volume” or “channel up” may be voice-outputted at the same time LED lighting is switched. By voice-outputting the name of a button, even a user having difficulty making out the small letters described on the upper surface of the remote control 100 can become more aware of which button is selectable at that time.

Furthermore, in order to prevent an erroneous selection by an operation of the external switch 2 immediately before a switchover of LED lighting, an LED may be arranged so as to be displayed blinking after a predetermined point in time before being switched to a next LED (for example, after one second prior to a switchover of lighting). Accordingly, the user is able to recognize that it is just before the switchover of LED lighting and that there is a higher risk of making an erroneous selection.

Moreover, when an operation signal of the external switch 2 is received immediately after the switchover of LEDs, it is probable that an erroneous selection has been made. Therefore, when an operation signal of the external switch 2 is received within a predetermined period of time after the switchover of LEDs (for example, within a period of 0.2 seconds after the switchover of LEDs), the operation signal may be arranged so as not to be received or processing may be performed on the assumption that the button of the LED lighted prior to the switchover has been selected. In addition, when a switchover is performed during sequential lighting of the respective buttons, all LEDs may be arranged so as to be temporarily turned off for a predetermined period of time (for example, 0.5 seconds) before lighting a next LED, and in the event where an operation signal of the external switch 2 is received when the LEDs are turned off, processing may be performed so that the operation signal is not accepted. Moreover, when an operation signal from the external switch 2 is not accepted, the non-acceptance is to be notified to the user by emitting a beep sound or the like.

Furthermore, in order to reduce the time from the lighting of the LED of a desired button that the user is about to select to an operation of the external switch 2, LEDs of currently selectable buttons may be arranged so as to be sequentially lighted and a button to be next selectable may be preliminarily displayed. By preliminarily displaying a button to be next selectable, the user is able to know in advance that the button to be selected is to become selectable next. Therefore, an erroneous selection can be prevented and the time from the lighting of the LED of the button to be selected to an operation of the external switch 2 for selecting the button can be reduced.

For example, when LEDs of currently selectable buttons are being displayed, by displaying an LED of a button to be next selectable according to a display method that differs from the display method of LEDs corresponding to currently selectable buttons, the user can be given advance notice of the button to be next selectable.

Figure 14:
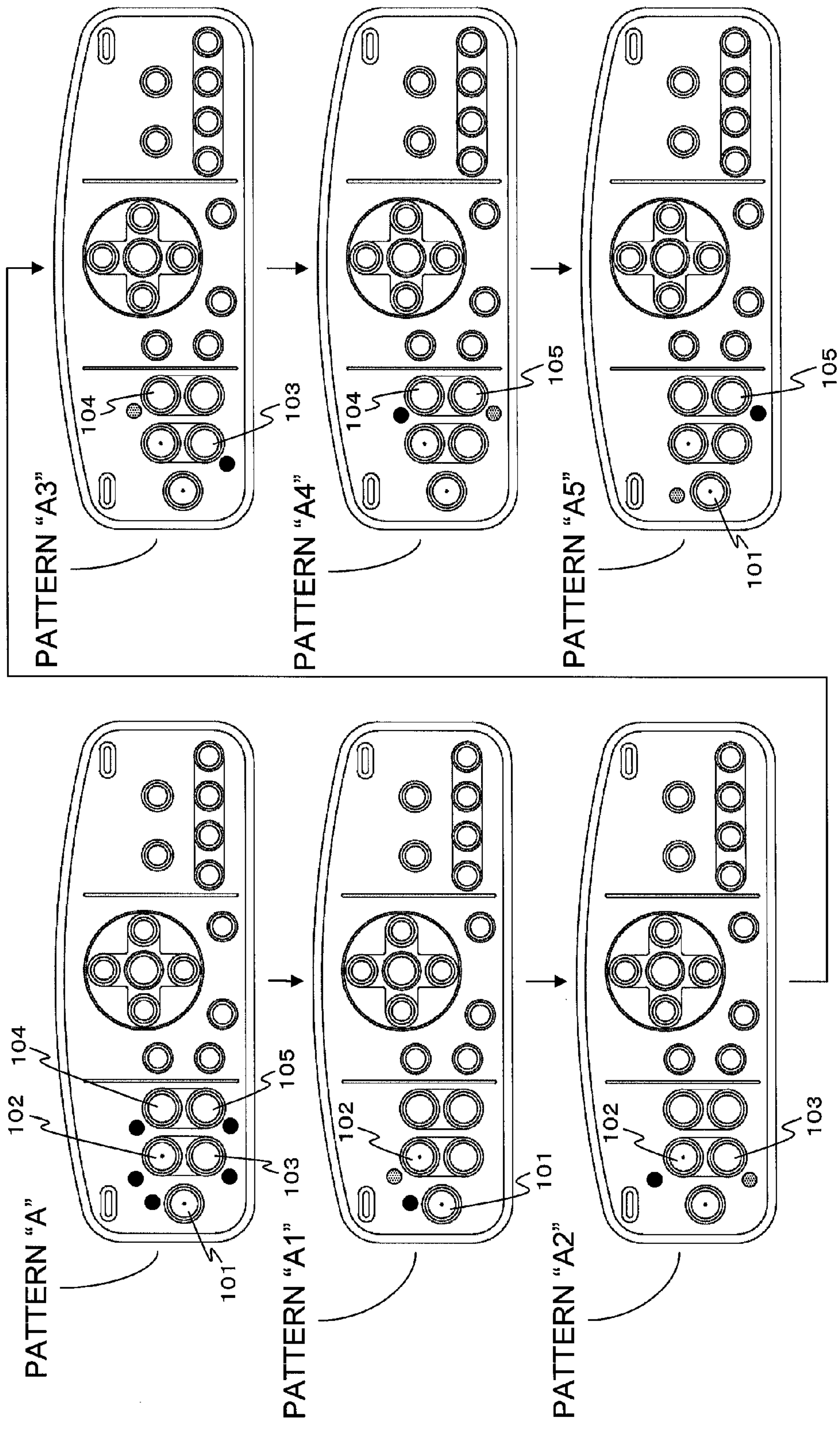
FIG. 14 is a diagram for describing a preliminary display operation when LEDs in group A are to be sequentially lighted after group A is selected in the remote control according to the first embodiment of the present invention.

FIG. 14 illustrates a diagram for describing a preliminary display operation when LEDs in group A are to be sequentially lighted after selection of group A. In FIG. 14, LEDs brightly lighted in yellow-green are indicated by black dots and LEDs dimly lighted in yellow are indicated by shaded dots.

When the external switch 2 is pressed during lighting of the LEDs of group A (step S21), it is determined that group A is selected. Subsequently, LEDs currently selectable by the external switch 2 in group A are sequentially lighted at each scan movement interval $T_2$ as illustrated by pattern A1 to pattern A5.

In pattern A1, the power button 101 is currently selectable and the LED corresponding to the power button 101 is brightly lighted in yellow-green. Similarly, the channel up button 102 in pattern A2, the channel down button 103 in pattern A3, the volume up button 104 in pattern A4, and the volume down button 105 in pattern A5 are respectively currently selectable by the external switch 2 and LEDs corresponding to the respective buttons are brightly lighted in yellow-green.

In this manner, the LED of the button selectable by the external switch 2 at a given point is lighted in yellow-green and the LED of the button to be selectable next is dimly lighted in yellow.

In pattern A1, since the button to be selectable in the next pattern A2 is the channel up button 102, the LED of the channel up button 102 is dimly lighted in yellow. Similarly, in the other patterns A2 to A5, as illustrated in FIG. 14, preliminary display is performed by dimly lighting in yellow the LED of the button to be selectable next by the external switch 2.

In the example illustrated in FIG. 14, while the LEDs to be preliminarily displayed is dimly displayed in a different color than the LEDs of buttons currently selectable by the external switch 2, other display methods may be adopted as long as the LEDs to be preliminarily displayed can be distinguished from the LEDs of buttons currently selectable by the external switch 2. For example, the LED of the button to become selectable next may be displayed blinking, displayed in a different color from the LED of the button currently selectable, displayed darkly, or may be displayed by a method that combines these display methods.

Moreover, a display method for performing such preliminary display corresponds to an example of "notifying, in advance, regular lighting by a predetermined method" according to the present invention. In addition, the display of an LED of a currently selectable button corresponds to an example of regular lighting according to the present invention, and the preliminary display of a button to become selectable next corresponds to an example of preliminary lighting according to the present invention. Moreover, preliminary lighting according to the present example is to include displaying by blinking and the like as described above.

The LED of a button to be preliminarily displayed is to be lighted or blinked within a period after the start of lighting of the LEDs of the currently selectable buttons and before the start of lighting indicating that the LED of the preliminarily displayed button is currently selectable. The preliminary display is to be performed over the entirety or for a part of the period.

In addition, while a description of preliminary display has been given above using the sequential lighting of LEDs in group A as an example, a group to be lighted next may be arranged so as to be preliminarily displayed during per-group sequential lighting illustrated in FIG. 6 and FIG. 8. For example, in pattern A illustrated in FIG. 8, LEDs of group A are to be lighted and, at the same time, LEDs of group B are to be preliminarily lighted for preliminary display.

As described above, by performing a preliminary display indicating a button to become selectable next, the user becomes aware of the button to become selectable next even when LEDs are sequentially lighted in a sequence not anticipated by the user. Therefore, the user can select a desired button without hesitation even when the number of times the LED is lighted or a lighting duration is varied for each button or when a lighting sequence is varied for each loop.

Furthermore, when a button is erroneously selected, the user must first perform an operation for cancelling the erroneously performed operation and then perform an operation for selecting a button that the user originally wanted to select. Since such operations must be respectively performed after awaiting loops in which desired LEDs are to be lighted, performing such operations takes a long period of time.

In consideration thereof, in order to reduce the time required for recovery when a button is erroneously selected, a function that enables the user to cancel the operation may be provided.

Figure 15:
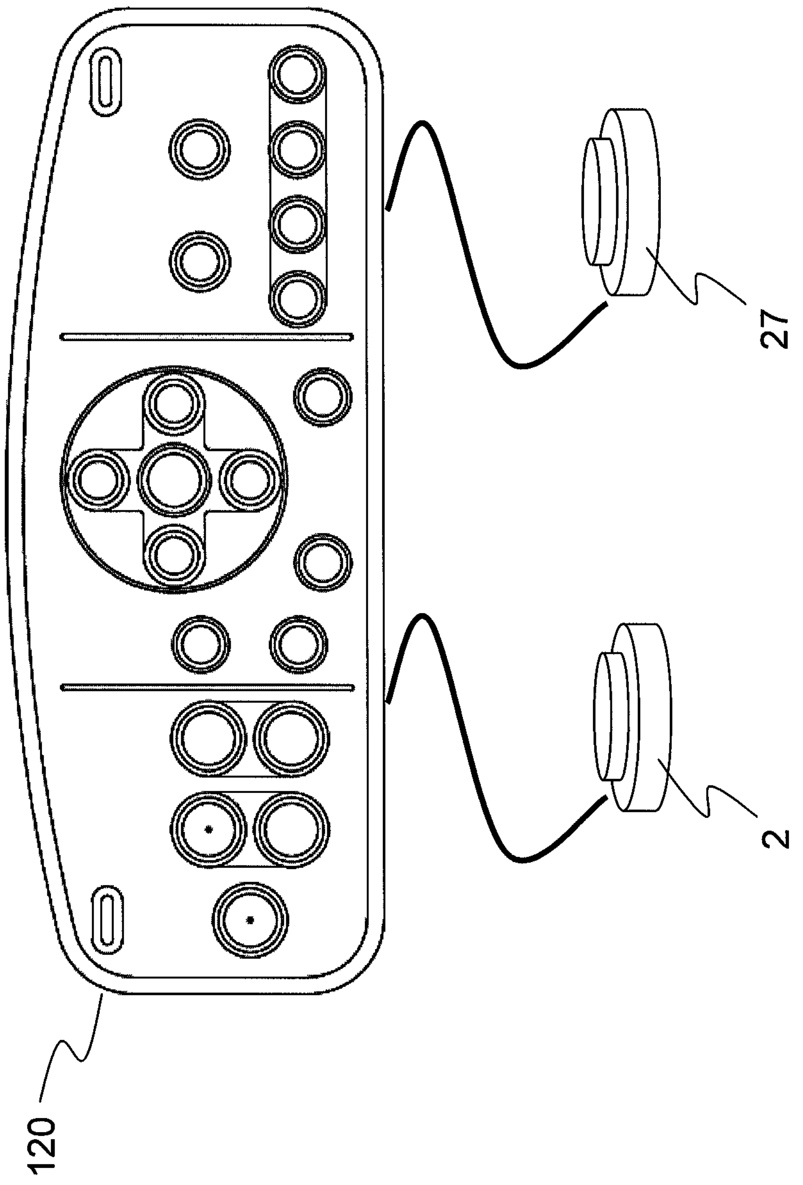
FIG. 15 is an overview of a remote control to which an undo external switch is connected according to the first embodiment of the present invention.

FIG. 15 illustrates an overview of a remote control configured such that an undo external switch for cancelling contents of an erroneously selected operation can be connected.

An undo external switch 27 is connected to the remote control 120 separately from the external switch 2. The undo external switch 27 is a switch that outputs a single signal upon being operated in the same manner as the external switch 2.

When the undo external switch 27 is operated during the lighting of the LED of the erroneously selected button for a lighting holding time after the operation of the external switch 2, the remote control 120 causes a signal for cancelling a signal transmitted from the infrared receiving/emitting unit 4 due to the erroneous selection to be transmitted from the infrared receiving/emitting unit 4. For example, assuming that the volume up button 104 is erroneously selected when the user operates the external switch 2 while trying to select the channel down button 103, a volume UP signal is transmitted from the infrared receiving/emitting unit 4. When the user realizes that an erroneous selection has been made and operates the undo external switch 27 during the lighting of the LED of the volume up button 104 for the lighting holding time, a volume DN signal that is a signal for cancelling the volume UP signal is transmitted from the infrared receiving/emitting unit 4.

As described above, by providing the undo external switch 27, even when a button is erroneously selected, a state prior to performing the erroneous operation can be promptly restored.

While an operation for cancelling an erroneous operation has been arranged so as to be performing using the undo external switch 27, the cancellation operation may be arranged so as to be performed using the external switch 2 instead of providing the undo external switch 27.

For example, an operation for cancelling an erroneous operation can be realized by the external switch 2 by judging that a request for cancelling a previous operation has been made when the external switch 2 is consecutively operated at a predetermined short interval (for example, an interval of 0.3 seconds or less) during the lighting of the LED of the erroneously selected button for a lighting holding time after the operation of the external switch 2, and having a signal for cancelling a signal transmitted from the infrared receiving/emitting unit 4 due to the erroneous selection to be transmitted from the infrared receiving/emitting unit 4.

Furthermore, in order to enable the user to promptly perform an operation on a button that the user wishes to select, a function may be provided which enables a lighting sequence of LEDs to be sequentially lighted to be reversed. When there are a large number of LEDs to be sequentially lighted in a lighting loop and the LED of the button that the user wishes to select is toward the back of the lighting loop, the desired button can be promptly selected by reversing the lighting sequence.

Figure 16:
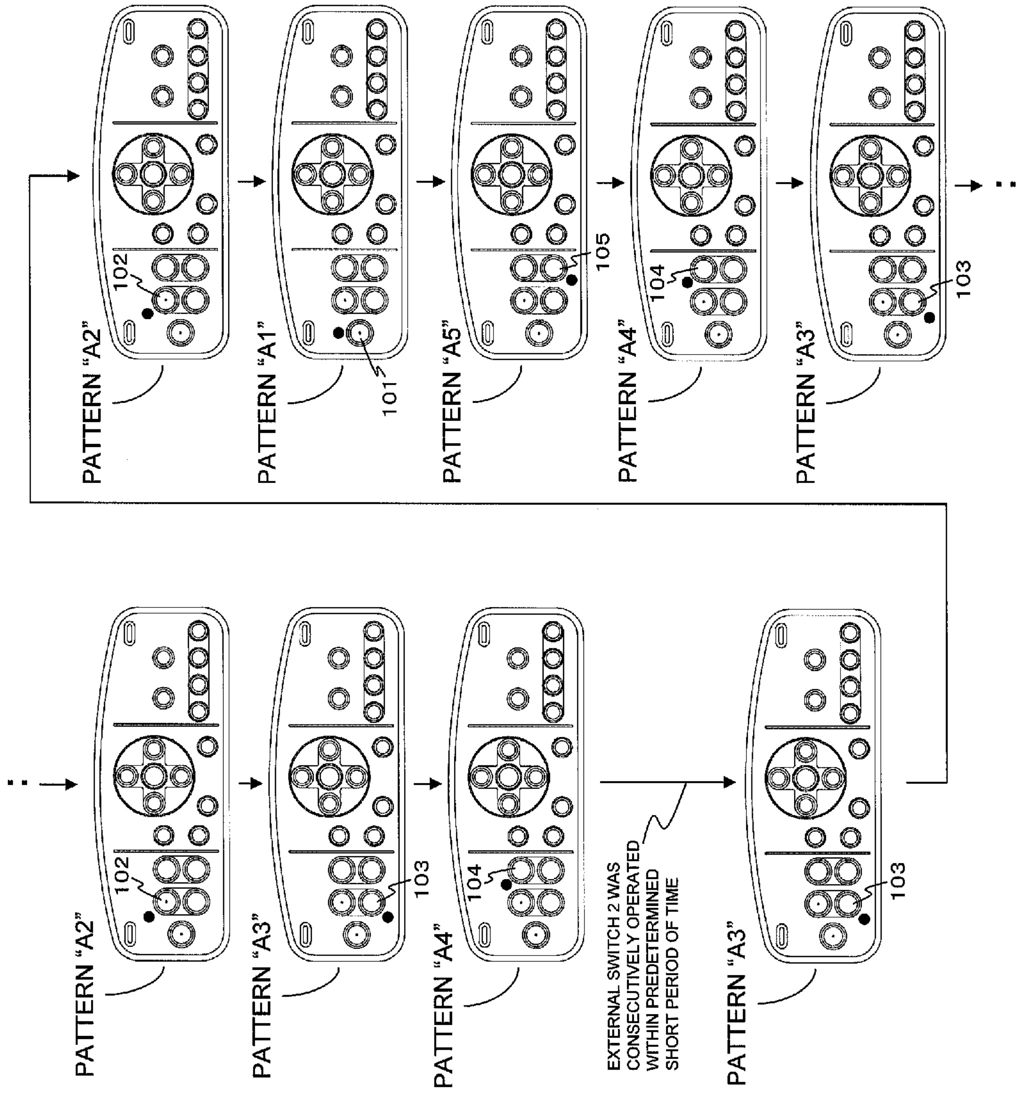
FIG. 16 is a diagram for describing an operation for reversing a lighting sequence when LEDs in group A are being sequentially lighted in the remote control according to the first embodiment of the present invention.

FIG. 16 illustrates a diagram for describing an operation for reversing a lighting sequence when LEDs in group A are being sequentially lighted.

In this case, it is assumed that the comparison/judgment unit 24 outputs an instruction signal for reversing the lighting sequence of the LEDs to the control unit 21 when the external switch 2 is consecutively operated within a predetermined short period of time.

As illustrated in FIG. 16, if the external switch 2 is consecutively operated within a predetermined short period of time as LEDs are being lighted in pattern A4 when the LEDs are being sequentially lighted in a sequence of pattern A2, pattern A3, . . . , then from that moment on, the LEDs are to be sequentially lighted in a reverse sequence of pattern A3, pattern A2, . . . . For example, when the channel down button 103 is about to be selected during pattern A4, four lighting switchovers of LEDs must occur. However, by reversing the lighting sequence, the channel down button 103 can now be selected after only one lighting switchover of LEDs.

After reversing the sequence of lighting of the LEDs, by once again consecutively operating the external switch 2 within the predetermined short period of time, the lighting sequence is once again reversed and the original lighting sequence of pattern A2, pattern A3, . . . , is restored.

In this case, while the lighting sequence of LEDs is arranged so as to be reversed by consecutively operating the external switch 2 within a predetermined short period of time, the lighting sequence of LEDs may also be arranged so as to be reversed by other methods. For example, a switch similar to the undo external switch 27 illustrated in FIG. 15 may be arranged so as to be connectable to the remote control, whereby the lighting sequence of the LEDs is to be reversed when the switch is operated.

By arranging the lighting sequence of LEDs to be reversible, even when a button is erroneously selected, an original state can be promptly restored and an originally intended operation can be promptly performed.

In the present first embodiment, all of the buttons 101 to 502 provided on the remote control 100 have been described as an example of "a plurality of predetermined keys" according to the present invention. By dividing the keys provided on the remote control into a plurality of groups and considering the plurality of buttons belonging to each group as "a plurality of predetermined keys" according to the present invention, a configuration where the remote control includes a plurality of configurations of "a plurality of predetermined keys" may be adopted.

In other words, in the present first embodiment, while the remote control 100 corresponds to an example of a "key input device" according to the present invention, a remote control including a plurality of "key input devices" according to the present invention may be adopted. In such a case, with a single remote control, operations described in the present first embodiment are to be performed by each key input device.

Moreover, in this case, keys provided on the remote control may include a button that does not belong to any of the "plurality of predetermined keys".

Since the remote control 100 according to the present first embodiment realizes functions corresponding to all buttons provided on the remote control by solely operating the external switch 2 and without having to directly press the buttons on the remote control, even a user likely to have difficulty pressing buttons on the remote control such as an elderly person with limited mobility of the upper limbs can easily realize all available functions.

In addition, in the present first embodiment described above, while the use of the external switch 2 has been described as an example of a first selecting unit and a second selecting unit according to the present invention, the first selecting unit and the second selecting unit according to the present invention may be configured so as to be integrally provided with a remote control instead of being configured as a separate unit to be connected to the remote control such as the external switch 2.

Figure 17:
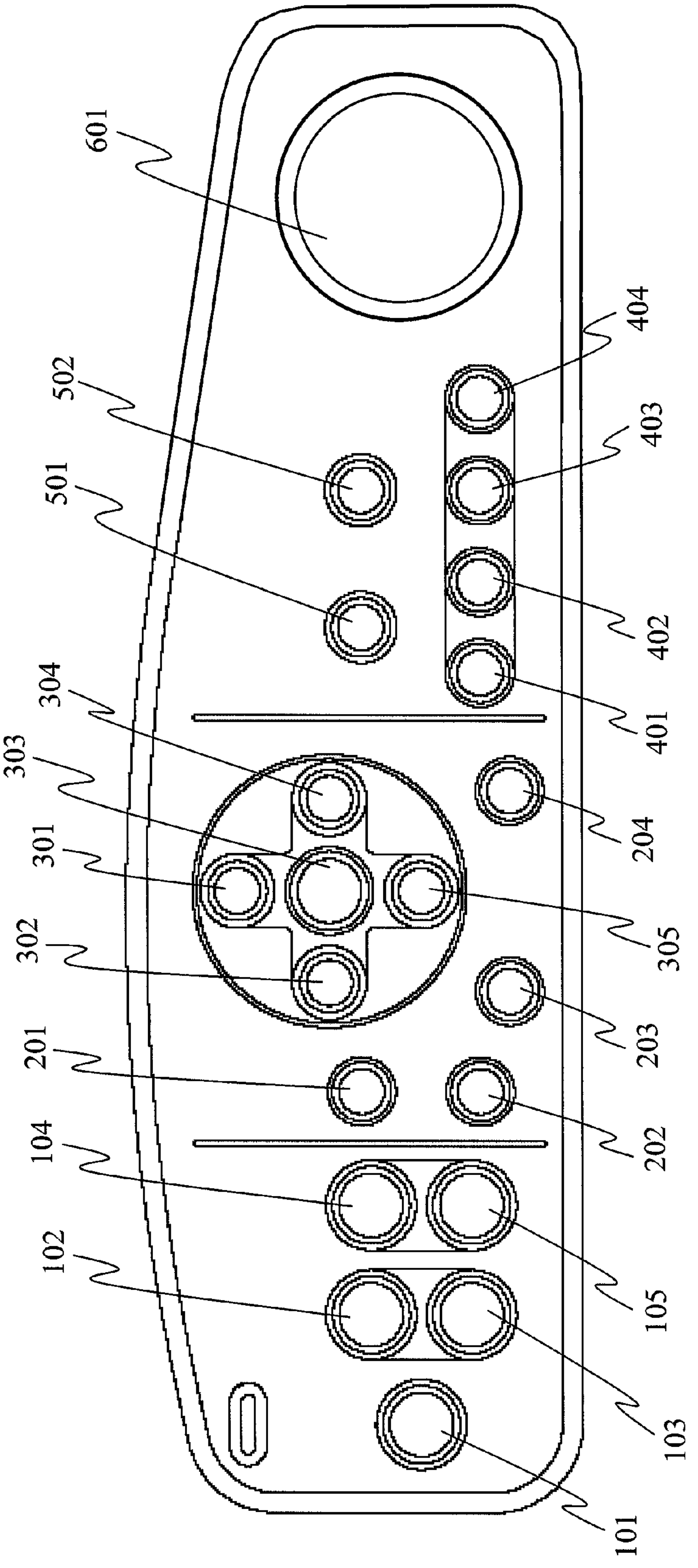
FIG. 17 is an overview of a remote control configured such that a first selecting unit and a second selecting unit are integrally provided according to the first embodiment of the present invention.

FIG. 17 illustrates an overview of a remote control configured so that the first selecting unit and the second selecting unit according to the present invention are integrally provided with the remote control. The same components as in FIG. 2 are denoted by the same reference numerals.

In addition to the configuration of the remote control 100 illustrated in FIG. 2, a remote control 121 illustrated in FIG. 17 includes, on a right side of an upper surface thereof, a simplified operation switch 601 that is bigger and easier to operate than the other buttons 101 to 502. The simplified operation switch 601 is a large button that is arranged at an easily-pressed position so that the button can easily be pressed by even a user likely to have difficulty pressing buttons on the remote control such as an elderly person with limited mobility of the upper limbs. In order to prevent other smaller buttons 101 to 502 from being simultaneously pressed when operating the switch, the simplified operation switch 601 may be provided so as to protrude further toward the upper surface than the other buttons 101 to 502.

When the simplified operation switch 601 is pressed, the remote control 121 operates in the same manner as when the external switch 2 connected to the remote control 100 is pressed. Therefore, by simply pressing the easy-to-press simplified operation switch 601, functions corresponding to all buttons provided on the remote control can be realized without having to press the small buttons 101 to 502 on the remote control 121.

Second Embodiment

In the first embodiment, as illustrated in FIG. 1, the remote control 100 has been described as including one external switch connecting unit to which the external switch 2 can be connected.

A remote control according to a second embodiment of the present invention differs from the remote control 100 according to the first embodiment in that the remote control includes a plurality of external switch connecting units to which external switches can be respectively connected.

Figure 18:
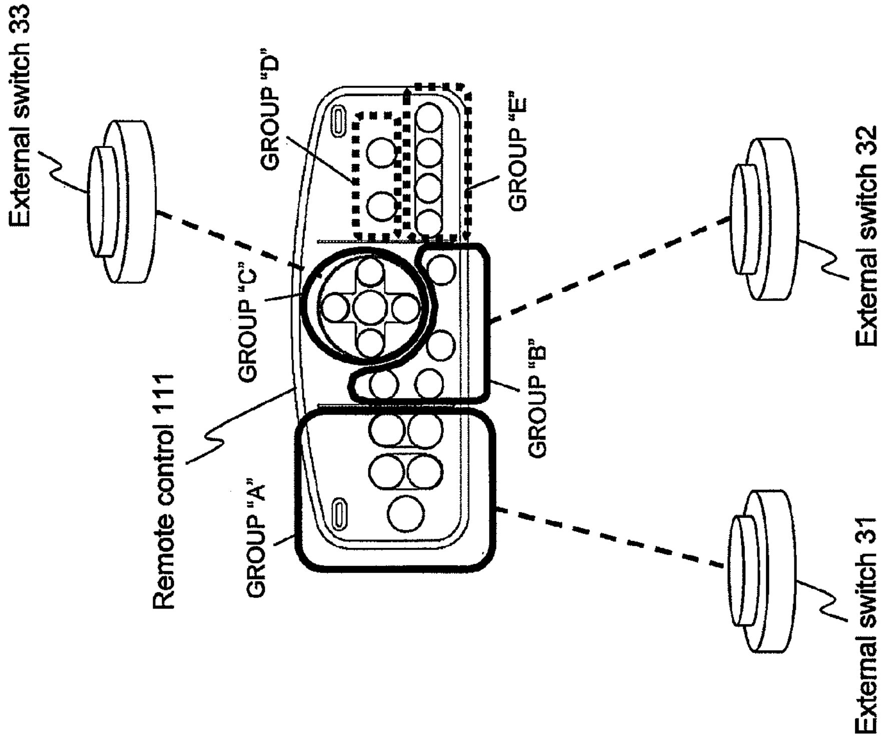
FIGS. 18(*a*) and 18(*b*) are connection configuration diagrams of a remote control according to a second embodiment of the present invention.
Figure 18:
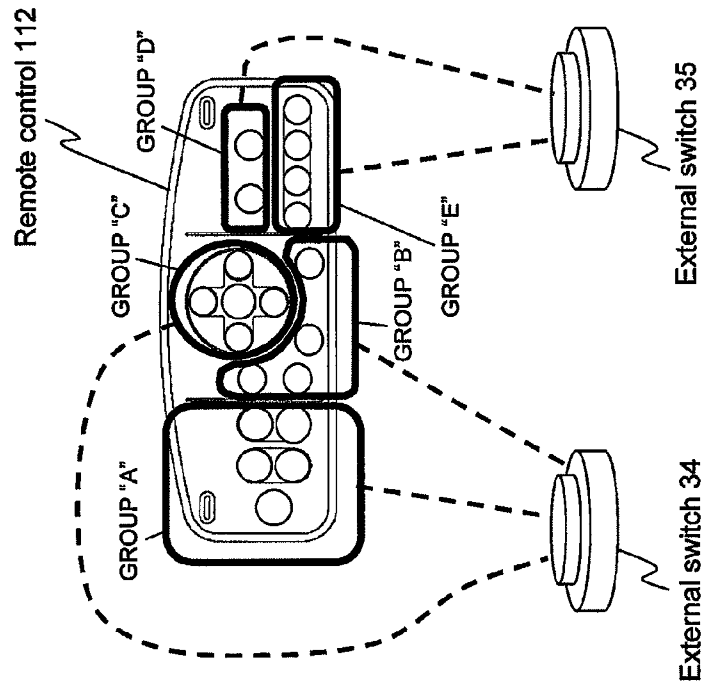

FIGS. 18(*a*) and 18(*b*) are connection configuration diagrams of the remote control according to the present second embodiment which includes a plurality of external switch connecting units.

The remote control according to the present second embodiment shares the same configuration as the remote control 100 according to the first embodiment illustrated in FIG. 3, wherein the remote control is divided into five groups, namely, group A, group B, group C, group D, and group E, according to the functions and arrangements of respective buttons 101 to 502.

A remote control 111 according to the present second embodiment illustrated in FIG. 18(*a*) has a plurality of external switch connecting units including three external switch connecting units to which external switches 31, 32, and 33 are respectively connected.

The external switches 31, 32, and 33 all share the same configuration as the external switch 2 according to the first embodiment illustrated in FIG. 1, and are switches that transmit a single signal in response to an operation of a user.

While the external switch 2 according to the first embodiment is arranged such that operations corresponding to buttons 101 to 502 belonging to all groups A to E are assigned to a single external switch 2, in the configuration according to the present second embodiment illustrated in FIG. 18(*a*), one of the external switches 31 to 33 is assigned to each group by one group unit.

Specifically, in the case of FIG. 18(*a*), operations corresponding to buttons 101 to 105 belonging to group A are assigned to the external switch 31, operations corresponding to buttons 201 to 204 belonging to group B are assigned to the external switch 32, and operations corresponding to buttons 301 to 305 belonging to group C are assigned to the external switch 33.

Therefore, when an LED corresponding to a button belonging to a group is being lighted, an operation by the external switches 31 to 33 is only enabled when the operation is by the external switch assigned to the group, and is not enabled when an external switch assigned to another group is operated.

For example, if the external switch 33 is operated when LEDs corresponding to the buttons 301 to 305 belonging to group C are being sequentially lighted, the buttons 301 to 305 corresponding to the LED being lighted upon operation of the external switch 33 is judged to be selected and a signal corresponding to the button is transmitted from an infrared receiving/emitting unit 4. However, if the external switch 31 or the external switch 32 is operated in this case, the operation is invalid.

In a similar manner, for example, when selecting the buttons 101 to 105 belonging to group A, only an operation by the external switch 31 is valid.

In the case of the first embodiment, in order to select a button, a group must first be selected from the groups A to E and a desired button must then be selected from the selected group. However, in the case of the configuration according to the present second embodiment illustrated in FIG. 18(*a*), since each one of the external switches 31 to 33 is assigned to one group, a group need not be selected.

Therefore, since the processing illustrated in FIG. 7 in the first embodiment can be performed without having to perform the processing illustrated in FIG. 6, a desired button can be selected more promptly than the case of the first embodiment.

In addition, since one of the external switches 31 to 33 is assigned to each group, for each group, sequentially lighting buttons belonging to the group is to suffice. Therefore, for buttons belonging to different groups, pluralities of LEDs corresponding to the buttons may be lighted at the same time.

Moreover, in the case of the configuration example illustrated in FIG. 18(*a*), while the buttons 401 to 502 which belong to group D and group E cannot be selected by operations of the external switches 31 to 33, the buttons can be selected by directly operating the buttons 401 to 502 on the remote control 111.

Therefore, by arranging groups to which frequently-used buttons belong to be also selectable by the external switches 31 to 33 and arranging groups to which belong buttons less frequently used to be directly operated by the buttons on the remote control 111, frequently-operated functions can be arranged so as to be operated by an external switch kept close at hand.

In addition, in the case of the configuration illustrated in FIG. 18(*a*), by further connecting other external switches to other external switch connecting units assigned to group D and group E, the buttons 401 to 502 belonging to group D and group E can also be arranged so as to be selectable by the external switches.

A configuration according to the present second embodiment illustrated in FIG. 18(*b*) is similar to the configuration illustrated in FIG. 18(*a*) in that the configuration includes a plurality of external switch connecting units to which external switches can be connected. However, buttons belonging to a plurality of groups are now assigned to a single external switch.

In a remote control 112 according to the present second embodiment illustrated in FIG. 18(*b*), external switches 34 and 35 are respectively connected to two external switch connecting units.

The external switches 34 and 35 both share the same configuration as the external switch 2 according to the first embodiment illustrated in FIG. 1, and are switches that transmit a single signal in response to an operation of a user.

Specifically, in the case of FIG. 18(*b*), operations corresponding to the buttons 101 to 305 which belong to group A, group B, and group C are assigned to the external switch 34, and operations corresponding to the buttons 401 to 502 which belong to group D and group E are assigned to the external switch 35.

When selecting a desired button, an external switch assigned to the group to which the desired button belongs is first selected and the desired button is then selected from the selected group.

For example, when selecting the up button 301 belonging to group C, group C is first selected by operating the external switch 34 during lighting of LEDs of group C when LEDs of the three groups, namely, group A to group C, are being sequentially lighted per group.

Subsequently, by operating the external switch 34 during lighting of the LED of the desired up button 301 when LEDs corresponding to the buttons 301 to 305 belonging to the selected group C are being sequentially lighted, the up button 301 is determined to be selected and a remote control signal corresponding to the up button 301 is transmitted from the infrared receiving/emitting unit 4.

In a similar manner to the first embodiment, using the external switch 34, a group is first selected and a desired button is then selected from the selected group. However, compared to the first embodiment where all five groups A to E are assigned to a single external switch 2, in the case of the configuration according to the present second embodiment illustrated in FIG. 18(*b*), since a group is to be selected from the three groups A to C assigned to the external switch 34, a group can be selected in a shorter period of time than the first embodiment.

Moreover, while a plurality of groups are respectively assigned to the external switches 34 and 35 in the configuration illustrated in FIG. 18(*b*), only one group may alternatively be assigned to one of the external switches and the remaining groups to the other external switch.

In addition, the assignment of groups to each external switch may be arranged so as to be freely performed according to user settings.

For example, in a case of a user for which the frequency of use of the buttons 101 to 105 belonging to group A is higher than the frequency of use of the other buttons, only group A is to be assigned to the external switch 34 and the other groups B to E are to be assigned to the external switch 35. In this case, the buttons 101 to 105 belonging to group A can be selected in an efficient manner because a group need not be selected and the desired button 101 to 105 can be selected by a single operation of the external switch 34.

In addition, by arranging the assignment of groups to each external switch so as to be freely performed according to user settings, a particular function can be arranged so as to be either solely usable or solely unusable. For example, since an erroneous operation of the volume up button 104 may produce a blast of sound which may startle those nearby, the volume up button 104 may be arranged so as to be unusable through an external switch.

Furthermore, in the present second embodiment, the correspondence between the external switches and the groups may be further clarified by color-coding. For example, in the case of FIG. 18(*a*), by matching a color of an area where the buttons of group A are arranged among a surface of the remote control 111 on which buttons are arranged with a color of the external switch (for example, using red), matching a color of an area of the buttons of group B with a color of the external switch 32 (for example, using green), and matching a color of an area of the buttons of group C with a color of the external switch 33 (for example, using blue), the user can recognize the correspondence between the external switches and the groups at a glance. Accordingly, the user can be prevented from pressing an external switch corresponding to a wrong group.

Moreover, instead of color-coding an area of each group on the surface of the remote control 111 on which buttons are arranged, colors of LEDs to be lighted for the respective groups may be arranged so as to differ from each other. For example, in accordance with the respective colors of the external switches 31, 32, and 33 described above, the colors of the LEDs to be lighted for the respective groups A, B, and C may be arranged so as to differ among red, green, and blue.

While the remote controls according to the present first and second embodiments are remote controls that are easy to use to an elderly person with limited mobility of the upper limbs or the like, the remote controls can also be conveniently used by a physically unimpaired person. For example, by assigning only the frequently-used channel up button 102 and the channel down button 103 to an external switch, a channel operation can be performed using one's foot while sitting on a sofa and viewing a television 1.

Next, an embodiment of an invention related to the present invention will be described below.

Third Embodiment

A remote control according to a third embodiment is arranged so as to be operated by a user by directly pressing buttons on the remote control without connecting an external switch.

A configuration diagram of a remote control system according to the third embodiment is the configuration illustrated in FIG. 1 without the external switch 2 being connected.

A button arrangement of the remote control according to the third embodiment is the same as that of the remote control 100 according to the first embodiment and is as illustrated in FIG. 2. In addition, in a similar manner to the first embodiment, LEDs are arranged in correspondence to respective buttons 101 to 502 as illustrated in FIG. 4.

Figure 19:
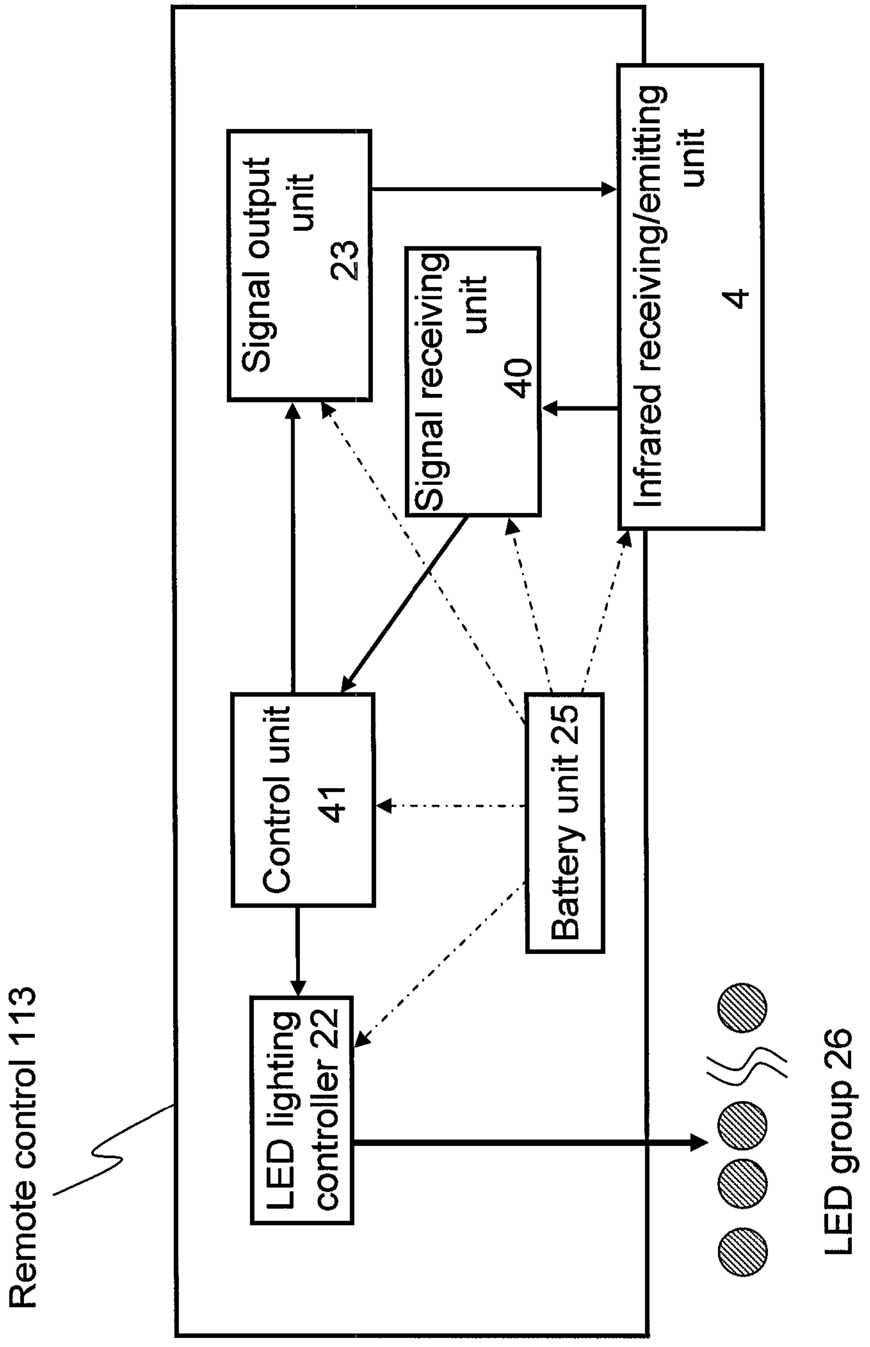
FIG. 19 is a block diagram illustrating an internal configuration of a remote control according to a third embodiment of an invention related to the present invention.

FIG. 19 is a block diagram illustrating an internal configuration of a remote control 113 according to the third embodiment. The same components as in FIG. 5 are denoted by the same reference numerals.

The remote control 113 is configured so as to internally include the respective units of a control unit 41, an LED lighting controller 22, a signal output unit 23, an infrared receiving/emitting unit 4, a signal receiving unit 40, and a battery unit 25. The control unit 41, the LED lighting controller 22, the signal output unit 23, the infrared receiving/emitting unit 4, and the signal receiving unit 40 are all supplied driving power from the battery unit 25.

Moreover, the signal output unit 23 corresponds to an example of an output unit according to an invention related to the present invention, and the signal receiving unit 40 corresponds to an example of a receiving unit according to an invention related to the present invention.

The control unit 41 notifies information on pressed buttons 101 to 502 to the signal output unit 23 and transmits an LED lighting instruction to the LED lighting controller 22.

Upon receiving the LED lighting instruction, the LED lighting controller 22 lights an LED of a button corresponding to the LED lighting instruction received from the control unit 41.

The signal receiving unit 40 receives information on a screen transition state of a television 1 transmitted from the television 1 at the infrared receiving/emitting unit 4, and notifies the control unit 41. According to the screen transition state of the television 1, the control unit 41 determines buttons 101 to 502 whose operation is enabled in that state, and transmits a lighting command signal to the LED lighting controller 22 so as to light LEDs corresponding to the enabled buttons.

Operations of the remote control 113 according to the third embodiment will now be described using a specific example.

Figures 20A, 20B, 20C, 20D:
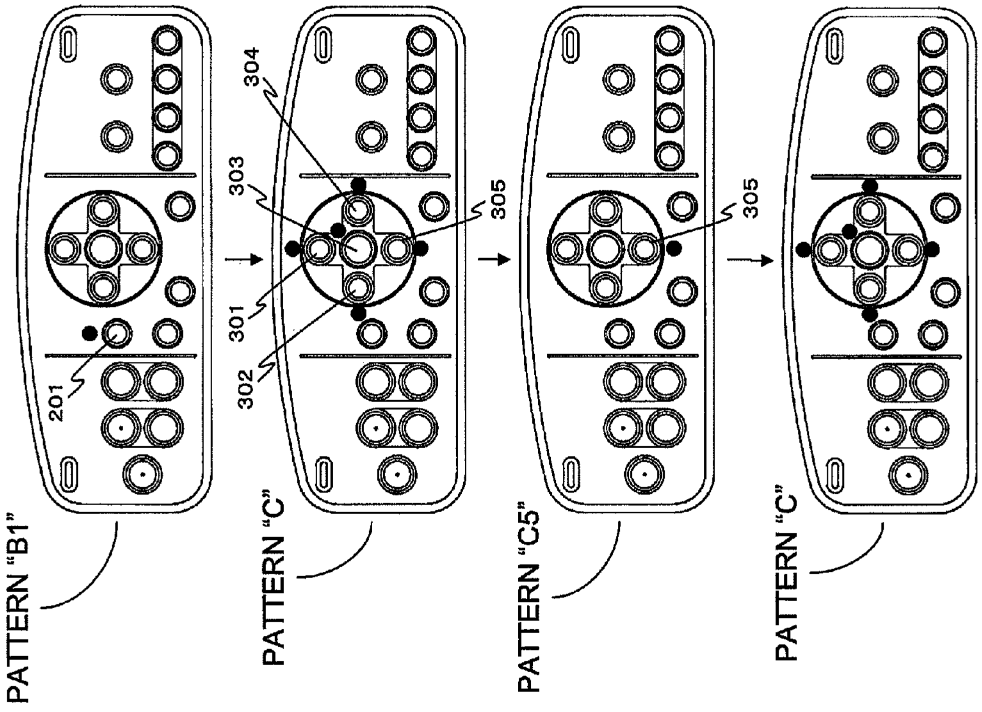
FIGS. 20(*a*) to 20(*d*) are diagrams illustrating a lighting transition example of LEDs of respective buttons when buttons of the remote control are directly pressed according to the third embodiment of the invention related to the present invention.

FIGS. 20(*a*) to 20(*d*) are diagrams illustrating a lighting transition example of LEDs of respective buttons when buttons of the remote control 113 are directly pressed.

For example, when the user has selected the link button 201, the remote control 113 senses that an up, down, left, or right operation is to be required as a next operation from a state of a television screen received from the signal receiving unit 40 and lights the LEDs of group C.

First, when the user selects the link button 201, the control unit 41 notifies the signal output unit 23 of information to the effect that the link button 201 has been selected. The signal output unit 23 causes a remote control signal for instructing an activation of a device operation screen to be transmitted from the remote control-side infrared receiving/emitting unit 4 to the television. At the same time, as illustrated in FIG. 20(*a*), the control unit 41 sends a lighting command signal to the LED lighting controller 22 and causes the LED lighting controller 22 to light the LED corresponding to the link button 201 for a lighting holding time that is a predetermined constant period of time.

Next, from television screen state information received from the signal receiving unit 40, the control unit 41 senses that a button that can be operated next is any of the up button 301, the left button 302, the decision button 303, the right button 304, and the down button 305, and transmits an LED lighting command to the LED lighting controller 22 so that LEDs corresponding to the buttons 301 to 305 are lighted for each predetermined constant period of time. In response thereto, the LED lighting controller 22 lights the instructed LEDs as illustrated in FIG. 20(*b*).

Next, for example, when the user selects the down button 305, the control unit 41 notifies the signal output unit 23 of information to the effect that the down button 305 has been selected, and the signal output unit 23 causes a remote control signal corresponding to the down button 305 to be transmitted from the remote control-side infrared receiving/emitting unit 4 to the television. At the same time, as illustrated in FIG. 20(*c*), the control unit 41 sends a lighting command signal to the LED lighting controller 22 and causes the LED lighting controller 22 to light the LED corresponding to the down button 305 for the lighting holding time.

Subsequently, once again, from television screen state information received from the signal receiving unit 40, the control unit 41 senses that a button that can be operated next is any of the up button 301, the left button 302, the select button 303, the right button 304, and the down button 305, and transmits an LED lighting command to the LED lighting controller 22 so that LEDs corresponding to the buttons 301 to 305 are lighted for each predetermined constant period of time. In response thereto, the LED lighting controller 22 lights the instructed LEDs as illustrated in FIG. 20(*d*).

A specific example of a method used by the control unit 41 to detect a button whose LED is to be lighted based on television screen state information received from the signal receiving unit 40 will now be described.

For example, sets of buttons and the like selectable according to a screen display state of a television are to be saved as a table in the remote control 113. When the control unit 41 receives a screen display state of a television 1 from the signal receiving unit 40, buttons and the like that can be operated in accordance with the screen display state at that time are read from the table. An LED lighting command is transmitted to the LED lighting controller 22 so that LEDs corresponding to the read buttons are lighted for each constant period of time. At this point, when there are a plurality of buttons and the like whose LEDs are to be lighted, the LEDs may be controlled so as to be lighted sequentially.

In addition, instead of transmitting television screen state information to the remote control 113, the television 1 may be arranged so as to transmit information on buttons and the like of the remote control to be enabled next to the remote control 113 according to a screen display at that time. In this case, for example, button information of the up button 301, the down button 305, the left button 302, the right button 304, the return button 204, or the like is to be transmitted from the television 1 during menu display. At this point, buttons that are not required to be clearly indicated may be assumed not to be operation objects and may be arranged not to be transmitted from the television 1. For example, volume operation buttons may be considered not to be operation objects.

In such a case, the remote control 113 stores information on buttons and the like that can be operated received from the television 1 in a primary memory, and the control unit 41 performs control so as to either simultaneously light the LEDs or sequentially light the LEDs on the assumption that the buttons are operation objects.

As described above, the remote control 113 according to the third embodiment is capable of acquiring a state of the television 1 main body, and by lighting LEDs according to the state of the television 1 main body, the remote control 113 can indicate enabled buttons in accordance with each screen and can make operations of functions of the television more approachable.

Moreover, while LEDs corresponding to buttons that can be operated are arranged so as to be clearly indicated by lighting the buttons according to the state of the television screen, only buttons more likely to be operated may be arranged so as to be lighted among the buttons that can be operated. By lighting the LEDs of buttons more likely to be operated, a button to be pressed next can be induced and operations of functions of the television can be made even more approachable.

The remote control 113 according to the third embodiment only clearly indicates buttons that can be operated or buttons that are likely to be operated. Therefore, since a desired button need only be selected from a small number of clearly indicated buttons, the remote control is easy to use for even an elderly person or the like with impaired judgment who may become bewildered when selecting a desired button from a large number of buttons.

Moreover, while a structure where LEDs are provided in the vicinity of buttons and characters of button notations are illuminated has been described as an example in the respective embodiments, a device in which the buttons themselves are lighted may also be used.

In addition, the names of the buttons of the remote controls realized in the respective embodiments are not restrictive and may be replaced according to the type of television to be operated and the like.

Furthermore, the number of buttons of the remote controls realized in the respective embodiments is not restrictive and may be altered according to the type of television to be operated and the like.

Moreover, the button arrangements and button groupings of the remote controls realized in the respective embodiments are not restrictive.

In addition, while an operation has been defined when the remote controls realized in the respective embodiments are to be operated by an external switch involving operating the external switch twice during a predetermined short constant period of time, the number and method of operations are not limited to such an arrangement and may be replaced with an operation involving continuously pressing the external switch for a predetermined constant period of time or longer. The number of pressing operations, the length of the pressing duration, and the like may be set at will.

Furthermore, the LED lighting time and the number of times the LEDs are to be lighted in the remote controls realized in the respective embodiments can be set at will.

Moreover, in the respective embodiments, after the end of an operation, an LED is arranged so as to be turned off when no operations are performed within a predetermined constant period of time or when an operation is performed in which an external switch is pressed twice. However, a specification may alternatively be adopted where a turn-off timing of an LED of the remote control is also coordinated with a state of a television screen acquired from a television via the television-side infrared receiving/emitting unit 3 and by sensing that a Program Guide or a menu screen has been erased from the television screen.

In addition, a function may be provided in which a button that is likely to be operated after a lapse of a constant period of time is lighted according to a state of a screen, such as when no operations are made on buttons belonging to group C within a predetermined period of time, the return button 204 is lighted before returning to the lighting of LEDs per group.

Furthermore, a function may be provided for buttons whose number or frequency of operations differ from each other among buttons belonging to the same group such as the red button 402 and the yellow button 404 belonging the group D, in which the function involves lighting only the LED of the button with a high frequency of use and limiting the number of times the LED is lighted for the button with a low frequency of use. Moreover, the lighting time of the LED of the button with a high frequency of use may be extended and the lighting time of the LED of the button with a low frequency of use may be reduced. In a similar manner, when selecting a group, the lighting time for each group may be arranged so as to differ from each other depending on the frequency of use of the buttons belonging to each group.

In addition, when it is apparent that the user is to use only a part of the functions, a function may be provided for limiting the groups whose LEDs are to be lighted, such as lighting only the LEDs of group A.

Moreover, many universal remote controls and the like are designed on the premise that the remote control is to be held in one hand and operated by the thumb of the hand holding the remote control or the remote control is to be placed on a table or the floor and operated by the thumb or the index finger. As such, for a user incapable of holding a remote control with one hand or selecting a small button necessary for a desired operation from a large number of buttons and operating the button with one hand such as an elderly person with limited mobility of the upper limbs or a user with a disability in the upper limbs, it is difficult to select and separately press a button. Since performing a desired operation on a television is difficult as described above, a configuration may be adopted so as to increase the size of the remote control main body or the sizes of the buttons in order to make the buttons more easy to press and operate.

Moreover, the program of the present invention is a program for causing a computer to execute the operations of the first control step in which the plurality of light-emitting units are sequentially lighted for each predetermined period of time for each group determined in advance or the plurality of light-emitting units are sequentially lighted for each predetermined period of time for each group determined in advance, in a color or brightness that differs from other groups, the first comparison/judgment step in which a group selected when lighting had been performed for each group determined in advance or when lighting had been performed in the different color or the different brightness for each group determined in advance is judged to be a finalized group, the second control step in which the respective light-emitting units included in the finalized group are sequentially lighted for each predetermined period of time or the respective light-emitting units included in the finalized group are sequentially lighted for each predetermined period of time in a color or brightness that differs from other light-emitting units, and the second comparison/judgment step in which a key selected when the light-emitting unit included in the finalized group had been lighted or when the light-emitting unit included in the finalized group had been lighted in the different color or the different brightness is judged to be a finalized key, of the above-described key input method of a key input device for a remote control apparatus of the present invention and is a program which operates in cooperation with the computer.

Moreover, the recording medium of the present invention is a recording medium having recorded thereon a program for causing a computer to execute the first control step in which the plurality of light-emitting units are sequentially lighted for each predetermined period of time for each group determined in advance or the plurality of light-emitting units are sequentially lighted for each predetermined period of time for each group determined in advance, in a color or brightness that differs from other groups, the first comparison/judgment step in which a group selected when lighting had been performed for each group determined in advance or when lighting had been performed in the different color or the different brightness for each group determined in advance is judged to be a finalized group, the second control step in which the respective light-emitting units included in the finalized group are sequentially lighted for each predetermined period of time or the respective light-emitting units included in the finalized group are sequentially lighted for each predetermined period of time in a color or brightness that differs from other light-emitting units, and the second comparison/judgment step in which a key selected when the light-emitting unit included in the finalized group had been lighted or when the light-emitting unit included in the finalized group had been lighted in the different color or the different brightness is judged to be a finalized key, of the above-described key input method of a key input device for a remote control apparatus of the present invention and is a computer-readable recording medium, the program of which, when read, is used in cooperation with the computer.

Moreover, the above-mentioned "operation of the step" of the present invention means the operation of all or a part of the step.

Moreover, in one use form of the program according to the present invention, the program may be recorded in the recording medium such as ROM readable by the computer, and operated in cooperation with the computer.

Moreover, in another use form of the program according to the present invention, the program may be transmitted across the network such as the Internet, or through the transmission media such as light, electric wave or sound wave, read by the computer and operated in cooperation with the computer.

Moreover, the computer according to the present invention described above is not limited to the pure hardware such as CPU, but may comprise a firmware, OS, or peripheral devices.

As described above, the configuration of the present invention may be implemented by software or hardware.

INDUSTRIAL APPLICABILITY

The remote control apparatus, the key input device for the remote control apparatus, and the input method and the like of the key input device according to the present invention are advantageously easily used even by an elderly person with impaired judgment or impaired physical performance, and are useful as a remote control attached to a television set or the like or a separately-sold remote control for a television set, a key input device for such remote control apparatuses, and an input method and the like of the key input device.

REFERENCE SIGNS LIST

1 television
2, 31, 32, 33, 34, 35 external switch
3 television-side infrared receiving/emitting unit
4 remote control-side infrared receiving/emitting unit
21, 41 control unit
22 LED lighting controller
23 signal output unit
24 comparison/judgment unit
25 battery unit
26 LED group
27 undo external switch
40 signal receiving unit
100, 111, 112, 113, 120, 121 remote control
101 power button
102 channel up button
103 channel down button
104 volume up button
105 volume down button
201 link button
202 program list button
203 sub menu button
204 return button
301 up button
302 left button
303 decision button
304 right button
305 down button
401 blue button
402 red button
403 green button
404 yellow button
501 broadcasting switching button
502 data broadcasting button
601 simplified operation switch

The invention claimed is:

1. A key input device for a remote control apparatus, the key input device comprising:

a plurality of predetermined keys that operate an operation object device;

a plurality of light-emitting units which are provided on or in the vicinity of the respective keys and which are to be lighted;

a lighting control unit that controls lighting of the plurality of light-emitting units based on an inputted lighting signal;

a receiving unit which receives a signal indicating a state of the operation object device from the operation object device;

a first control unit that outputs, to the lighting control unit, a lighting signal that causes, according to the received signal indicating the state of the operation object device, the plurality of light-emitting units to be sequentially lighted for each predetermined period of time for each group determined in advance or a lighting signal that causes, according to the received signal indicating the state of the operation object device, the plurality of light-emitting units to be sequentially lighted for each predetermined period of time for each group determined in advance, in a color or brightness that differs from other groups;

a first selecting unit that outputs a signal for selecting one of the groups;

a first comparison/judgment unit that inputs output signals of the first control unit and the first selecting unit and outputs, as a finalized group, a group selected when the light-emitting unit had been lighted or when the light-emitting unit had been lighted in the different color or the different brightness;

a second control unit that outputs, to the lighting control unit, a lighting signal that causes the respective light-emitting units included in the finalized group to be sequentially lighted for each predetermined period of time or a lighting signal that causes the respective light-emitting units included in the finalized group to be sequentially lighted for each predetermined period of time in a color or brightness that differs from other light-emitting units;

a second selecting unit that outputs a signal for selecting one of the keys; and a second comparison/judgment unit that inputs output signals of the second control unit and the second selecting unit and outputs, as a finalized key, a key corresponding to the light-emitting unit that had been lighted upon selection or a key corresponding to the light-emitting unit that had been lighted in the different color or the different brightness upon selection, wherein when only one light-emitting unit is included in the finalized group, the first comparison/judgment unit outputs a key corresponding to the light-emitting unit as a finalized key.

2. The key input device for a remote control apparatus according to claim 1, wherein a single externally-connected switch device functions as both the first selecting unit and the second selecting unit, and the switch device outputs a single on/off signal.

3. The key input device for a remote control apparatus according to claim 1, wherein the predetermined period of time during which each group is to be lighted is a period determined in advance for each group, and the predetermined period of time during which each light-emitting unit is to be lighted is a period determined in advance for each light-emitting unit.

4. The key input device for a remote control apparatus according to claim 1, wherein the first control unit and the second control unit output a lighting signal that causes lighting in a predetermined color or at a predetermined brightness to the lighting control unit, in regards to the light-emitting unit corresponding to one or more of the keys that cannot operate the operation object device depending on a state of the operation object device, the first control unit outputs a lighting signal that causes sequential lighting at a predetermined period of time in a color or at a brightness that differs from other groups, for each of the groups determined in advance, to the lighting control unit, in regards to the plurality of light-emitting units with the exception of the light-emitting unit corresponding to the key that cannot operate the operation object device depending on a state of the operation object device, and the second control unit outputs a lighting signal that causes sequential lighting at a predetermined period of time in a color or at a brightness that differs from other light-emitting units, for each light-emitting unit included in the finalized group, to the lighting control unit, in regards to the plurality of light-emitting units with the exception of the light-emitting unit corresponding to the key that cannot operate the operation object device depending on a state of the operation object device.

5. A key input device for a remote control apparatus, the key input device comprising:

a plurality of predetermined keys that operate an operation object device;

a plurality of light-emitting units which are provided on or in the vicinity of the respective keys and which are to be lighted;

a lighting control unit that controls lighting of the plurality of light-emitting units based on an inputted lighting signal;

a first control unit that outputs, to the lighting control unit, a lighting signal that causes the plurality of light-emitting units to be sequentially lighted for each predetermined period of time for each group determined in advance or a lighting signal that causes the plurality of light-emitting units to be sequentially lighted for each predetermined period of time for each group determined in advance, in a color or brightness that differs from other groups;

a first selecting unit that outputs a signal for selecting one of the groups;

a first comparison/judgment unit that inputs output signals of the first control unit and the first selecting unit and outputs, as a finalized group, a group selected when the light-emitting unit had been lighted or when the light-emitting unit had been lighted in the different color or the different brightness;

a second control unit that outputs, to the lighting control unit, a lighting signal that causes the respective light-emitting units included in the finalized group to be sequentially lighted for each predetermined period of time or a lighting signal that causes the respective light-emitting units included in the finalized group to be sequentially lighted for each predetermined period of time in a color or brightness that differs from other light-emitting units;

a second selecting unit that outputs a signal for selecting one of the keys; and a second comparison/judgment unit that inputs output signals of the second control unit and the second selecting unit and outputs, as a finalized key, a key corresponding to the light-emitting unit that had been lighted upon selection or a key corresponding to the light-emitting unit that had been lighted in the different color or the different brightness upon selection, wherein when only one light-emitting unit is included in the finalized group, the first comparison/judgment unit outputs a key corresponding to the light-emitting unit as a finalized key; and when regular lighting of the light-emitting unit for an arbitrary one of the light-emitting units or for each of the groups is to be performed, at least one of the first control unit and the second control unit outputs, to the lighting control unit, a lighting signal for notifying, in advance, regular lighting of the light-emitting unit which is to be next subjected to regular lighting by a predetermined method during at least one predetermined period of time among periods of time after a point in time at which the regular lighting is to be started and before a point in time at which regular lighting of the light-emitting unit to be next subjected to regular lighting is started, and causes the light control unit to perform preliminary lighting.

6. A key input method of a key input device for a remote control apparatus including a plurality of predetermined keys for operating an operation object device and a plurality of light-emitting units which are provided on or in the vicinity of the respective keys and which are to be lighted, the key input method comprising:

a first control step in which a signal indicating a state of the operation object device from the operation object device is received and the plurality of light-emitting units are, according to the received signal indicating the state of the operation object device, sequentially lighted for each predetermined period of time for each group determined in advance or the plurality of light-emitting units are, according to the received signal indicating the state of the operation object device, sequentially lighted for each predetermined period of time for each group determined in advance, in a color or brightness that differs from other groups;

a first selecting step in which a signal for selecting one of the groups is outputted;

a first comparison/judgment step in which a group selected when lighting had been performed for each group determined in advance or when lighting had been performed in the different color or the different brightness for each group determined in advance is judged to be a finalized group;

a second control step in which the respective light-emitting units included in the finalized group are sequentially lighted for each predetermined period of time or the respective light-emitting units included in the finalized group are sequentially lighted for each predetermined period of time in a color or brightness that differs from other light-emitting units;

a second selecting step in which a signal for selecting one of the keys is outputted; and a second comparison/judgment step in which a key selected when the light-emitting unit included in the finalized group had been lighted or when the light-emitting unit included in the finalized group had been lighted in the different color or the different brightness is judged to be a finalized key, wherein when only one of the light-emitting units is included in the finalized group, a key corresponding to the light-emitting unit is judged to be the finalized key in the first comparison/judgment step.

7. A non-transitory computer-readable medium having a program recorded thereon for causing a computer to execute the key input method of a key input device for a remote control apparatus according to claim 6.

* * * * *